(12) United States Patent
Salomon et al.

(10) Patent No.: US 11,983,286 B2
(45) Date of Patent: May 14, 2024

(54) MANAGING QUERIES WITH DATA PROCESSING PERMITS

(71) Applicant: Switchbit, Inc., San Francisco, CA (US)

(72) Inventors: Yacov Salomon, Danville, CA (US); Seth Yates, Danville, CA (US); Maxwell Anderson, San Francisco, CA (US); Vivek Vaidya, San Francisco, CA (US); Anton Winter, San Mateo, CA (US); Samuel Alexander, San Francisco, CA (US); Tom Chavez, San Francisco, CA (US)

(73) Assignee: Ketch Kloud, Inc., San Francisco, CA (US)

( * ) Notice: Subject to any disclaimer, the term of this patent is extended or adjusted under 35 U.S.C. 154(b) by 189 days.

(21) Appl. No.: 16/847,222

(22) Filed: Apr. 13, 2020

(65) Prior Publication Data
US 2021/0319128 A1    Oct. 14, 2021

(51) Int. Cl.
| | | |
|---|---|---|
| G06F 21/00 | (2013.01) | |
| G06F 16/242 | (2019.01) | |
| G06F 16/2453 | (2019.01) | |
| G06F 21/31 | (2013.01) | |
| G06F 21/60 | (2013.01) | |
| G06F 21/62 | (2013.01) | |

(52) U.S. Cl.
CPC ...... *G06F 21/6218* (2013.01); *G06F 16/2423* (2019.01); *G06F 16/24534* (2019.01); *G06F 21/31* (2013.01); *G06F 21/602* (2013.01)

(58) Field of Classification Search
CPC .. G06F 21/31; G06F 21/6218; G06F 16/2423; G06F 16/24534
See application file for complete search history.

(56) References Cited

U.S. PATENT DOCUMENTS

| | | | |
|---|---|---|---|
| 10,936,744 B1 * | 3/2021 | Trepetin | H04L 63/0421 |
| 2013/0191650 A1 * | 7/2013 | Balakrishnan | G06F 21/6227 |
| | | | 713/190 |

(Continued)

OTHER PUBLICATIONS

U.S. Appl. No. 16/741,666, Salmon, et al; Yacov.

*Primary Examiner* — Joseph P Hirl
*Assistant Examiner* — Chi D Nguy
(74) *Attorney, Agent, or Firm* — Holland & Hart LLP

(57) ABSTRACT

Methods, systems, and devices for data processing are described. Some database systems may implement data processing permits to manage data access. A database system may use encryption schemes to tie permits to data (e.g., cryptographically ensuring that the system follows data regulations). To support queries for a database implementing such encryption schemes, the database may implement a proxy. When the system receives a query, the database proxy may intercept and transform the query based on the encryption schema of the database. The database proxy may execute the transformed query at the database, receive encrypted query results in response, and decrypt the results for use by the querying application. Additionally, the system may access relevant data processing permits to support querying operations. For example, the system may use permits when transforming the query, executing the query in the database, preparing query results for the querying application, or any combination thereof.

18 Claims, 11 Drawing Sheets

(56) References Cited

U.S. PATENT DOCUMENTS

| | | | |
|---|---|---|---|
| 2017/0124139 A1* | 5/2017 | Farkash | G06F 16/2365 |
| 2018/0182049 A1* | 6/2018 | Oberle | G06F 16/2457 |
| 2019/0327239 A1* | 10/2019 | Ferguson | H04L 9/0819 |
| 2020/0117824 A1* | 4/2020 | Upadhyay | G06F 16/258 |
| 2020/0218826 A1* | 7/2020 | Nohara | G09C 1/00 |
| 2020/0364224 A1* | 11/2020 | Hay | G06F 16/2379 |
| 2020/0401708 A1* | 12/2020 | Friedman | G06F 21/6245 |
| 2021/0089678 A1* | 3/2021 | Gkoulalas-Divanis | G06F 21/6218 |

* cited by examiner

MANAGING QUERIES WITH DATA PROCESSING PERMITS

FIELD OF TECHNOLOGY

The present disclosure relates generally to database systems and data processing, and more specifically to managing queries with data processing permits.

BACKGROUND

Database systems may be subject to a number of data regulations. Data regulations may specify how a database system may store data and how the database system may support access to the data. Examples of such regulations may include the European Union's General Data Protection Regulation (GDPR), the Health Insurance Portability and Accountability Act (HIPAA) for health-related data privacy, and the Federal Trade Commission's (FTC's) data and privacy regulations for financial institutions, among other such regulations. In some cases, implementing a system that handles legitimizing reasons for accessing data separate from data processing may fail to ensure technically that the system uses the data in the proper manner, resulting in a great deal of risk for the organization running the database system. That is, simply claiming to follow the rules may not meet the high standards of some data protection regulations, leaving an organization liable or facing prohibitive cost if the system uses any user data incorrectly (e.g., without the proper consent or legitimizing reason). Additionally, in some cases, following data regulations at a database system may result in a number of processing inefficiencies, potential security risks, or both. For example, decrypting data at query time in a database (e.g., to support checking legitimizing reasons) may result in insecure storage of data (e.g., at least temporarily while executing a query).

DETAILED DESCRIPTION

Figure 1:
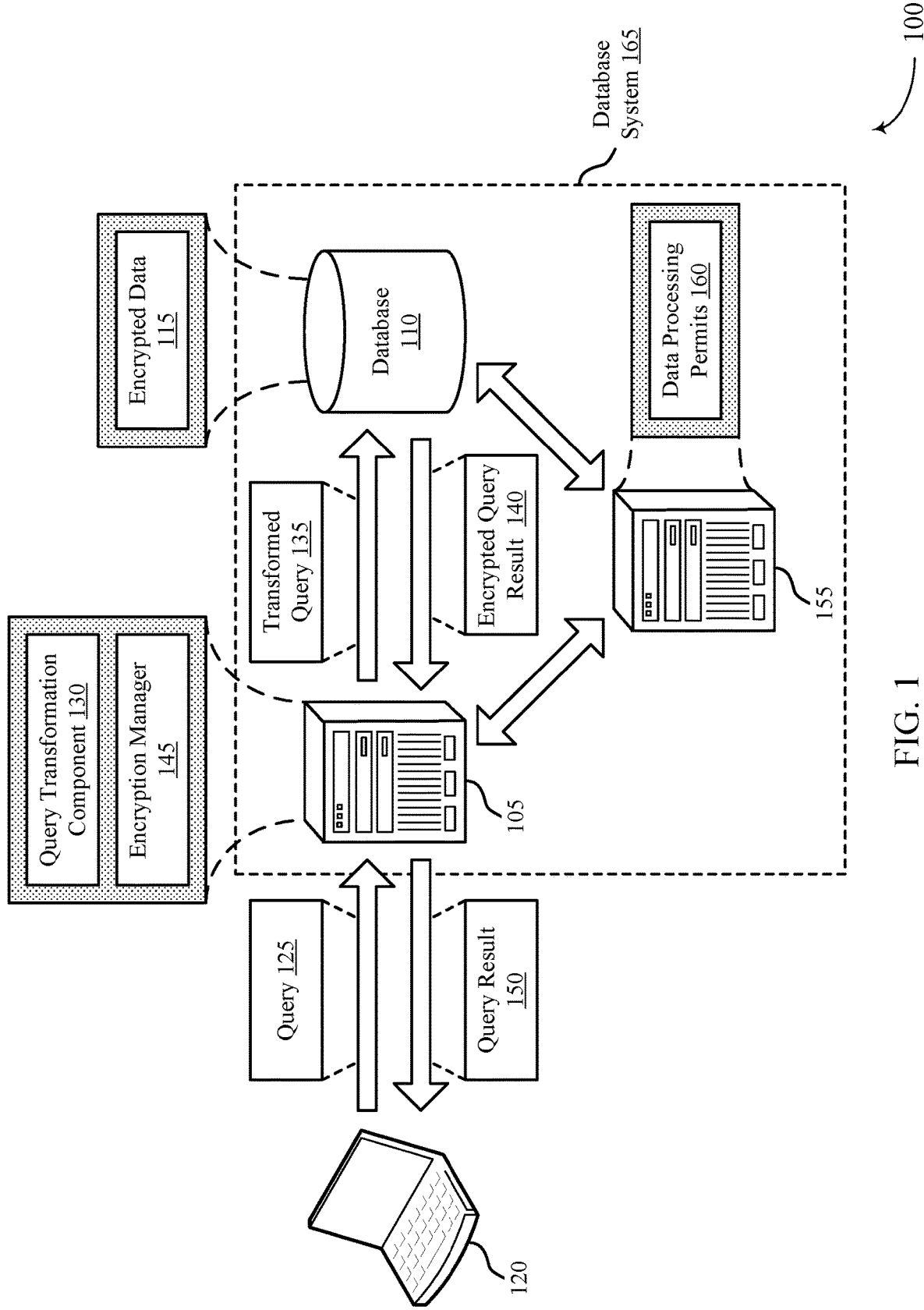
FIG. 1 illustrates an example of a system that supports managing queries with data processing permits in accordance with aspects of the present disclosure.

Data regulations may set rules and/or restrictions for how a data management system may collect, store, and process user data. To handle such data regulations, a system may implement data processing permits and cryptographic techniques to tie legitimizing reasons for using data (e.g., user consent) to data handling. For example, by tying user consent to data handling at a technical level, the system may automatically comply with data regulations and efficiently update to handle changing data regulations and/or regulations across different jurisdictions. However, data regulations may further specify security criteria for handling data in a database system. For example, the database system may secure user information by storing the user data as encrypted at rest in a database. The user data may be encrypted to ensure that the data is accessed by specific users or systems with the proper credentials and is used for specific purposes supported by legitimizing reasons (e.g., user consent or other regulations). The database may restrict other users or systems from accessing the data and may restrict requests for unauthorized usages of the data by withholding an encryption key corresponding to the encrypted data. Many applications may send queries, such as structured query language (SQL) queries, to the database system requesting access to data records. However, such applications may not be aware of how the database system is securely storing the data at rest. As such, the queries may request data using plaintext values, fields, and operators, which may not accurately represent the format of data in a database. Temporarily decrypting data to run such queries may expose private user data (e.g., for potential security breaches by malicious users). If the plaintext data is directly accessed in any way (e.g., within a database management system (DBMS)) to support querying, the DBMS may fail to uphold one or more data regulations associated with user privacy.

To maintain data security in a database system while supporting robust query functionality, the database system may implement a database proxy for managing queries. Furthermore, the database proxy, the underlying database, or both may integrate data processing permits into query transformation, query execution, query results processing, or some combination thereof to support privacy-by-design. For example, a database system may implement data processing permits to manage data access using one or more encryption schemes to tie permits to data (e.g., cryptographically ensuring that the system follows data regulations). To support queries for a database implementing such encryption schemes, the database may implement a database proxy (e.g., a server or shim). When the system receives a query, the database proxy may intercept and transform the query based on the encryption schema of the database. Transforming the query may involve transforming plaintext values to ciphertext values, indicating one or more user-defined functions (UDFs) in place of query operations to perform equivalent operations on encrypted data (e.g., homomorphically encrypted data), determining relevant data processing permits, or any combination of these processes. The database proxy may execute the transformed query at the database. Based on the query transformation and one or more UDFs supported by the DBMS, the database may execute the query directly on encrypted data (e.g., without decrypting the data even temporarily in the database). Such a process may maintain data security throughout query execution. Additionally or alternatively, the DBMS may implement policies and/or roles to support filtering data at execution time according to data processing permits. For example, one or more hidden columns in the database may support indications of user consent statuses for particular data fields, rows, or columns. The DBMS may filter out query results that are not consented to by an appropriate user.

The database may return encrypted query results to the database proxy in response to the transformed query, and the database proxy may decrypt the results for use by a querying application. In some cases, the database proxy may perform further processing of the query results (e.g., based on one or more data processing permits). For example, the database proxy may filter out information from the query results based on querying limits set by a data processing permit. The database proxy may send the resulting plaintext query results to an application in response to the query.

By implementing one or more of the techniques described herein, a database system may integrate a DBMS storing secure, encrypted data with a privacy-by-design technical framework. The database proxy may manage any types of queries entering the database system, such that a secure, encrypted database may accurately and efficiently run the queries (e.g., based on one or more query transformations). Using homomorphic encryption, UDFs, and data processing permits, the database system may maintain a high standard of data security at rest and at query time, comply with data privacy regulations (e.g., with technical guarantees), support robust querying functionality, and support consumer rights, such as private user data deletion.

Aspects of the disclosure are initially described in the context of systems supporting query management for a database. Additional aspects are described with reference to a database schema and a process flow. Aspects of the disclosure are further illustrated by and described with reference to apparatus diagrams, system diagrams, and flowcharts that relate to managing queries with data processing permits.

FIG. 1 illustrates an example of a system 100 that supports managing queries with data processing permits in accordance with aspects of the present disclosure. The system 100 may include a database system 165, including a database 110 and a database proxy 105. The database 110 may be an example of a single database, a distributed database, multiple distributed databases, a data store, an emergency backup database, or any other system supporting data storage. The database proxy 105 may be an example of a server, such as a single server, a server cluster, an application server, a database server, a proxy server, a cloud-based server, a virtual machine, or any other system, service, or device supporting data processing. The database system 165 may implement the database proxy 105 to handle queries 125 to the database 110. For example, using the database proxy 105, the system 100 may integrate a relational DBMS with a privacy-by-design framework implementing data processing permits 160 to achieve data security while complying with data privacy regulations.

The database 110 may store encrypted data 115 to ensure data security at rest. In some examples, an application, such as an application running on a user device 120 (e.g., a laptop, a desktop computer, a smartphone, a server, a tablet, a sensor, or any other computing device or system capable of generating, analyzing, transmitting, or receiving communications or data), may query the database 110 for data. The database proxy 105 may intercept—or otherwise receive—the query 125 to manage running the query 125 on the database 110 according to the specific database schema. For example, the database proxy 105 may intercept the query 125 based on the database 110 storing data records as encrypted data 115. As such, the database proxy 105 may operate as a shim between the application and the DBMS. The database proxy 105 may use encryption schemes, user-defined functions (UDFs) for the DBMS, or a combination thereof to transform and execute the query 125 at the database 110.

For example, the user device 120 may transmit a query 125 to the database system 165. The query 125 may be an example of a SQL query or a query following any other supported format. The database proxy 105 may receive the query 125 in order to transform the query 125. For example, an application may define the query 125 independent of the schema of the database 110. However, the database 110 may store data as encrypted data 115 in the database 110. To support security protocols, the database 110 may maintain data encryption at all times in the database 110 (e.g., in a DBMS). For example, the encrypted data 115 may be encrypted at rest in the database 110 and may be encrypted at query time in the database 110. In this way, plaintext data may not be available in the database 110. To support maintaining data encryption at query time (e.g., when executing a query at the database 110), the database proxy 105 may transform the query 125 to function properly within the database 110 on encrypted data 115. In some examples, using a query transformation component 130 (e.g., a component implemented in hardware, software executed by a processor, firmware, or any combination thereof), the database proxy 105 may transform the query 125 according to the database schema (e.g., an encryption schema of the database 110). The transformed query 135 may support execution on encrypted data 115 in the database 110.

The database proxy 105 may execute the transformed query 135 at the database 110. Based on transforming the query 125, the database 110 may execute the transformed query 135 on the encrypted data 115. For example, the database 110 may leverage a number of encryption schemes (e.g., homomorphic encryption schemes) to support both data security and query functionality. The query transformation component 130 may use the encryption schemes implemented in the database 110 and a set of UDFs to transform values specified in the query 125 (e.g., into ciphertext values), transform functions defined in the query 125 (e.g., into functions that operate on homomorphically encrypted data 115), or both. In this way, the database system 165 may execute queries (e.g., SQL queries) over encrypted data 115 by leveraging various encryption schemes in a homomorphic fashion.

The database 110 may execute the transformed query 135 on the encrypted data 115 to obtain an encrypted query result 140. For example, by maintaining data encryption in the database 110 throughout the query process, the results may also remain encrypted. By refraining from decrypting data in the database 110 (e.g., even temporarily for query execution), the database system 165 may maintain database security, protect against data leakage, and improve processing efficiency for query execution (e.g., as executing a query does not involve costly decryption processes in the database 110). Such operations may meet a standard for protecting user information (e.g., set by one or more privacy data regulations).

The database proxy 105 may receive (e.g., intercept) the encrypted query result 140 on the way out of the database 110. Using an encryption manager 145—and based on the encryption schema of the database 110—the database proxy 105 may decrypt the encrypted query result 140 to obtain a plaintext query result 150. The encryption manager 145 may be implemented in hardware, software executed by a processor, firmware, or any combination thereof. In some cases, the encryption manager 145 may use encryption keys stored separately from the database proxy 105 (e.g., in a key management service, a permit system 155, etc.). The database proxy 105 may transmit the plaintext query result 150 to the application (e.g., running on the user device 120) in response to the query 125. In some cases, the database proxy 105 may perform further processing on the query result 150 prior to transmitting the query result 150. The decryption, results processing, or both may enable the application receiving the query result 150 to interpret and utilize the query result 150 for the intended use case.

In addition to managing query execution on encrypted data 115, the database system 165 may support integration of a permit system 155 into the DBMS. For example, the database proxy 105, the database 110, or both may implement a number of techniques described herein to handle data processing permits 160 with encrypted data 115 to cryptographically ensure that queries 125 comply with data privacy regulations (e.g., out-of-the-box for any DBMS). Access to data, processing of data, or both may be governed by the permit system 155. Furthermore, the permit system 155 may support auditing of all database transactions (e.g., including queries).

The database system 165 may support a system of record (SOR), such as the permit system 155, for data processing permits 160. The permit system 155 may be an example of a server, a database, or some combination thereof supporting a permit service. The permit system 155 may manage legitimizing reasons for data use (e.g., user consent information and other legitimizing reasons) by generating data processing permits 160 that indicate a legitimizing reason for storing and/or accessing data. For a data processing permit 160, a legitimizing reason may be a user's consent or some other reason that the database system 165 may store and use the data. If a user consents to the system using the user's personal data for one or more data processing activities, the system may automatically create a data processing permit 160 indicating this consent. The data processing permit 160 may be user-specific and data processing activity-specific. Additionally, the data processing permit 160 may be associated with a permit key (e.g., a key encrypting key or key chain). For example, the permit key may include a pointer to the data processing permit 160, and the data processing permit 160 may include a key identifier (ID) for the permit key. In some cases, the permit system 155 may support creating, updating, and revoking data processing permits 160 (e.g., based on user inputs to a consent management user interface). In some such cases, the permit key's pointer may update to point to a latest relevant data processing permits 160 (e.g., based on a new or updated data processing permit 160 stored in the permit system 155).

To tie the data processing permits 160 to data, the database system 165 may implement one or more cryptographic techniques. The cryptographic techniques may be supported by the query transformation component 130, the encryption manager 145, or both at the database proxy 105. In some cases, one or more portions (e.g., identifiers) of the encrypted data 115 may be encrypted using a permit key. As such, identification of specific encrypted data records may rely on identifying an appropriate data processing permit 160 associated with the corresponding permit key.

The database system 165 may integrate data processing permits 160 in a number of ways to support querying operations. In a first example, a data processing permit 160 may be used for a query 125 entering the database system 165. For example, the database proxy 105 may use a data processing permit 160 to transform a query 125. The database proxy 105 may communicate with the permit system 155 to identify whether a relevant data processing permit 160 supports the query 125 (e.g., based on a user identifier associated with the queried data and a data processing activity for which the queried data is to be used). If the database proxy 105 identifies a relevant data processing permit 160 permitting the query 125, the database proxy 105 may use a permit key associated with the identified data processing permit 105 to encrypt a search term in the query 125. As such, the resulting transformed query 135 may successfully search the database 110 for data encrypted using the permit key.

In a second example, a data processing permit 160 may be used during query execution at the database 110. For example, the database 110 may perform filtering of encrypted data 115 based on a data processing permit 160. In some examples, the database 110 may implement a system of policies based on the data processing permits 160. For example, one or more policies in the database 110 may control access to data columns or rows based on the data processing permits 160.

In a third example, a data processing permit 160 may be used for a query result exiting the database system 165. For example, the database proxy 105 may use a data processing permit 160 to process a query result 150. In some cases, the database proxy 105 may filter a query result 150 based on a data processing permit 160 (e.g., defining a specific amount of data or number of data records that may be returned in response to a query 105). In some examples, the database system 165 may integrate the data processing permits 160 using any combination of the techniques described herein. Such integration may allow the database system 165 to manage any supported queries 125 (e.g., any types of queries, any query functions, etc.) with data processing permits 160 while maintaining data security in the database system 165.

For example, using the database proxy 105, the system 100 may handle any type of query 125. The system 100 may support transformation and execution of operational queries, user profile requests, analytics queries, input queries, or any combination of these or other types of queries. An operational query may potentially affect multiple rows and/or tables in the database 110 and may return projected rows. A user profile request may return data records for a single user, for example, from one or more tables in the database 110. An analytics query may be an example of a statistical query affecting multiple rows and/or multiple tables and may return aggregate statistics. The database system 165 may inject differential privacy into the aggregate statistics, for example, during query execution at the database 110. An input query may store data records for a user in the database 110 (e.g., using secure, cryptographic techniques), for example, if the permit system 155 has a legitimizing reason for the database 110 to store the data records. Accordingly, all queries 125 entering the database system 165 may hit the database proxy 105 and be transformed to support execution at the database 110 (e.g., on encrypted data 115).

Figure 2:
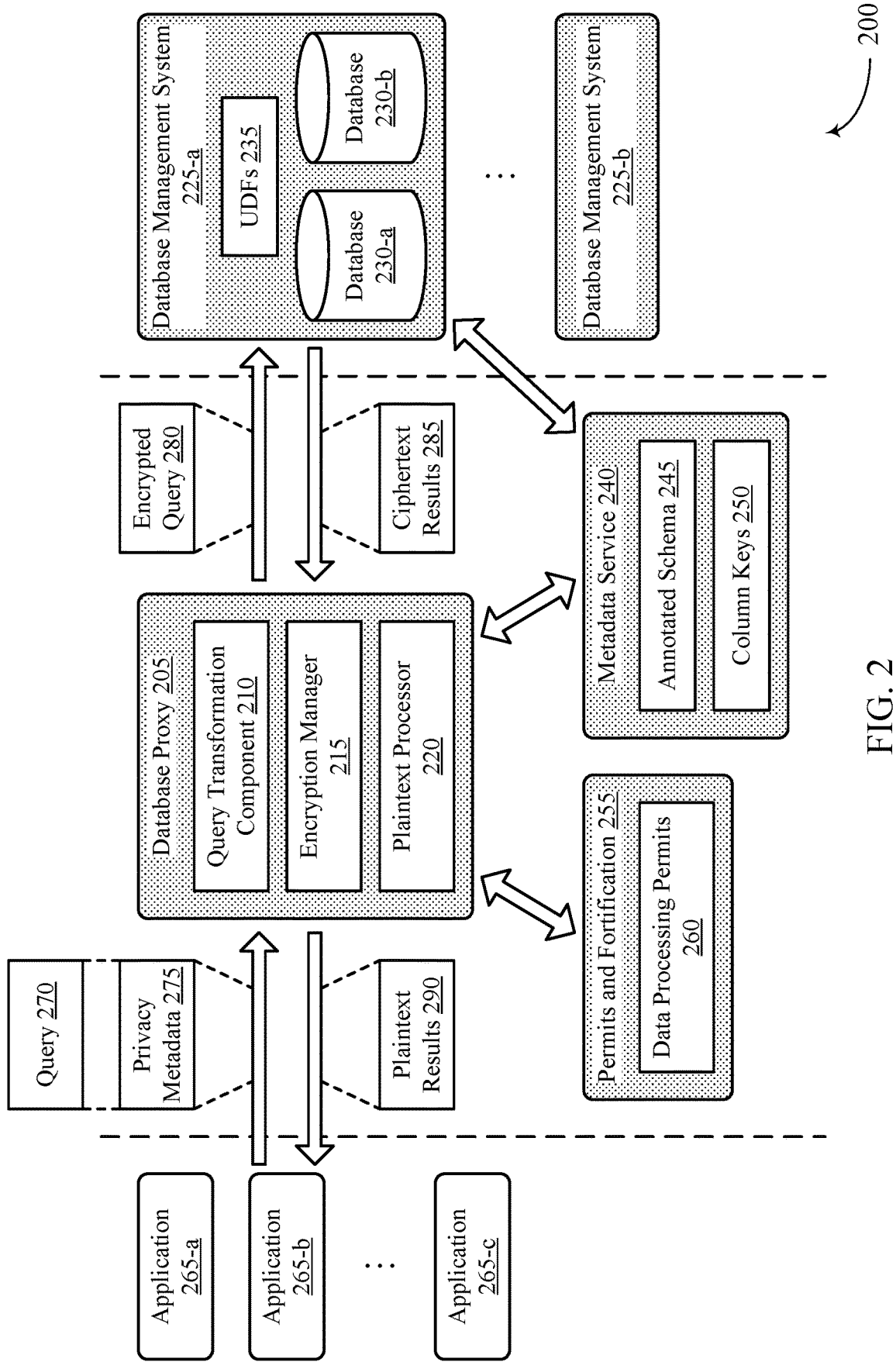
FIG. 2 illustrates an example of a system architecture that supports managing queries with data processing permits in accordance with aspects of the present disclosure.

FIG. 2 illustrates an example of a system architecture 200 that supports managing queries with data processing permits in accordance with aspects of the present disclosure. The system architecture 200 may be implemented by a system 100 as described with reference to FIG. 1. The system architecture 200 may include a database proxy 205 and one or more DBMSs 225, which may be example of a database proxy 105 and one or more databases 110 described with reference to FIG. 1. In some cases, the database proxy 205 may include a system of proxy services, or shims, supporting multiple DBMSs 225, such as DBMS 225-*a* and DBMS 225-*b*. The system architecture 200 may implement the database proxy 205 to manage queries 270 received from applications 265 (e.g., local applications, web sites, cloud-based services, etc.). In some examples, an application 265 may run at a user device, such as a user device 120 described with reference to FIG. 1, or at another system or service. The database proxy 205 may manage queries 270 for any number of applications 265, such as applications 265-a, 265-b, and 265-c. By supporting query transformations and results processing, the database proxy 205 may transparently modify queries 270 and query results to effectively provide data access to the applications 265 without the applications 265 relying on knowledge of the underlying database schema for a DBMS 225.

A DBMS 225 may leverage a number of encryption schemes to support query execution on encrypted data. The DBMS 225—for example, a relational DBMS 225—may apply each encryption scheme to a column in a database 230 using an encryption key (e.g., a column-specific key 250). In some examples, a DBMS 225, such as DBMS 225-a, may support a number of databases 230, such as databases 230-a and 230-b. For example, the DBMS 225 may be an example of a distributed database system.

In some cases, one or more of the leveraged encryption schemes may be examples of homomorphic encryption. Homomorphic encryption may support a database 230 performing a number of query operations on encrypted data (e.g., without decrypting the data at query execution time). Such a process may maintain data security throughout query execution while providing robust query functionality. The DBMS 225 may leverage a metadata service 240, a permits and fortification service 255, or both to support data security and query functionality. In some examples, the metadata service 240 may manage the column-specific keys 250 and the permits and fortification service 255 may manage data processing permits 260 (e.g., including permit keys). The encryption schema of the DBMS 225 may be based on the implemented encryption schemes, the column-specific keys 250, and the permit keys used to securely store data records in the databases 230. In some examples, the metadata service 240 or some other service may track an annotated schema 245 for the DBMS 225. Such an annotated schema 245 may support a query transformation component 210, an encryption manager 215, or both running at the database proxy 205.

Example encryption schemes implemented by a DBMS 225 may include random encryption (RND), deterministic encryption (DET), order preserving encryption (OPE), homomorphic encryption (HOM) (e.g., HOM enabling summation (HOM-SUM), HOM enabling products (HOM-PROD), HOM enabling searches (SEARCH), etc.), or any combination of these or other encryption schemes. RND may involve probabilistic symmetric encryption, such as advanced encryption standard (AES) encryption implementing a random or pseudo-random initialization vector (IV). Data encrypted using RND may be the most secure in the database 230 but may not support efficient computations on the resulting ciphertext. That is, randomly encrypted ciphertext may not support SQL functionality prior to decryption. DET may involve deterministic symmetric encryption, such as AES encryption implementing a constant IV. DET may support equality operations in the database 230, providing specific query functionality on encrypted data. For example, deterministically encrypted ciphertext may support SQL functionality, including WHERE clauses, HAVING clauses, GROUP BY clauses, JOIN* clauses, DISTINCT clauses, or some combination thereof. OPE may support order operations, range operations, or both. For example, order preserving encrypted ciphertext may support SQL functionality, including WHERE clauses, HAVING clauses, MIN clauses, MAX clauses, or some combination thereof. HOM-SUM may involve Paillier's approach to homomorphic encryption, enabling summation. For example, HOM-SUM encrypted ciphertext may support summations on ciphertext, averaging on ciphertext, or both, providing SQL functionality including SUM clauses, AVG clauses, or both. HOM-PROD may be based on a Rivest-Shamir-Adleman (RSA) algorithm supporting a homomorphic encryption approach for products. HOM-PROD encrypted ciphertext may support multiplication on ciphertext, providing SQL functionality including PROD clauses. SEARCH may be based on Song's approach to homomorphic encryption, enabling token searches. SEARCH encrypted ciphertext may support token search on ciphertext, providing SQL functionality including LIKE clauses. In some cases, the DBMS 225 may implement any number of other encryption schemes to support additional or alternative query functionality while maintaining a high degree of data security.

The set of encryption schemes used by the DBMS 225 may collectively be referred to as OnBoard encryption or column key-based encryption. The encryption scheme(s) used for a specific column in a database 230 may be based on the data stored in the column, an encryption standard for the data, or both. For example, when the system architecture 200 installs the database proxy 205 for DBMS 225-a, the database proxy 205 (or a service supporting the database proxy 205) may access the databases 230 within DBMS 225-a. In some examples, the database proxy 205 may scan a database 230-a to determine an initial schema of the database 230-a. In some other examples, the database proxy 205 may be provided with an annotated schema 245 of the database 230-a. Based on the initial schema, the database proxy 205 or a corresponding service may determine how to modify the database schema to support specific querying functionality. For example, the database proxy 205 or the associated service may determine a set of common functions or requested functions to support. Based on these functions, as well as one or more data regulations, data processing permits 260, or both, the database proxy 205 or service may select one or more encryption schemes to implement for each column in the database 230-a. The database proxy 205, service, or DBMS 225-a may update the data stored in the database 230-a using the selected encryption schemes. In some cases, the database proxy 205, the metadata service 240, or both may create one or more tables defining how data stored in the database 230 may be accessed, for example, including which columns to use for which query functions.

Additionally or alternatively, a DBMS 225 may encrypt one or more columns using individual permit keys (e.g., corresponding to data processing permits 260). For example, identifiers used for collecting legitimizing reasons for using data (e.g., user consent) may be encrypted using permit keys. In some cases, different data fields in a column may be encrypted using different permit keys based on the relevant data processing permit 260 for the data record including each data field. The permit keys may be examples of special database permits, keys in a key chain, or some combination thereof. Columns encrypted using such techniques may be available for equality SELECT query operations, such that executing a query on such columns may inherently involve checking for a data processing permit 260 supporting the query (e.g., during query transformation). Furthermore, in some cases, the database proxy 205 may manage collisions associated with permit key-encrypted columns. Permit-based encryption may be an example of OffBoard encryption. In some cases, the DBMS 225 may implement additional or alternative OffBoard encryption techniques. The OffBoard encryption techniques may be managed by a permits and fortification service 255. The encryption schema (e.g., the annotated schema 245) of a database 230 may involve both the homomorphic encryption schemes and permit-based encryption schemes implemented by the DBMS 225.

The database proxy 205 may use the encryption schema of a database 230 to perform query transformations (e.g., transparent to external applications 265). The database proxy 205 may implement a query transformation component 210, which may be an example of a query transformation component 130 described with reference to FIG. 1. For example, an application 265, such as application 265-*b*, may issue a query, such as a SQL query for a PostgreSQL system or some other query. The query may include a query 270 and any related privacy metadata 275. For example, the query 270 may include an indication of data associated with a database 230, and the privacy metadata 275 may indicate a data processing activity for using the data, a user identifier associated with a relevant data processing permit 260, or some combination thereof. The database proxy 205 may receive (e.g., intercept) the query 270 and associated privacy metadata 275 and may transform the query 270 based on the encryption schema of the database 230, the privacy metadata 275, or both. For example, the query transformation component 210 may transform the query 270 using one or more annotated schemas 245 (e.g., accessed via the metadata service 240), relevant encryption keys (e.g., column-specific keys 250, permit keys, or both), appropriate calls to UDFs 235 (e.g., UDFs 235 for the DBMS 225, UDFs 235 defined at the database proxy 205, or both), or any combination thereof to generate a transformed query (e.g., an encrypted query 280).

The database proxy 205 may issue the encrypted query 280 to the DBMS 225. The DBMS 225 may execute the encrypted query 280 at one or more databases 230 to obtain query results. In some examples, the DBMS 225 may leverage one or more UDFs 235 during query execution. In a first example, the DBMS 225 may call a specific UDF 235 to implement an equivalent primitive for a respective query function (e.g., a specific SQL clause or operator). An example operation may involve the DBMS 225 replacing a SUM operator with a corresponding UDF 235 implementing homomorphic addition on ciphertext (e.g., based on the transformed query). In a second example, the DBMS 225 may call a specific UDF 235 to implement encryption processes (e.g., encryption, decryption, re-encryption, key rotation, etc.) within the DBMS 225. Such UDF-based encryption processes may map from one ciphertext space to another ciphertext space without producing plaintext as an intermediate stage (e.g., to maintain data security in the DBMS 225). For example, the DBMS 225 may implement a UDF-based encryption process to remove layers of an encryption onion at query execution time, as described in more detail with reference to FIG. 3.

Additionally or alternatively, the DBMS 225 may control row and/or column access in a database 230 (e.g., a relational database) based on the data processing permits 260. For example, beyond column-level encryption, the DBMS 225 may restrict access to rows and/or columns of a database 230 using native DBMS policy and/or role functionality. Each table in a relational database may include data rows corresponding to specific data records and data columns corresponding to specific data fields. As such, a table may store the data field values for a set of data records in a relational format, supporting logical data access and organized data storage. In some cases, a table may additionally store one or more "hidden" columns (e.g., columns that do not support querying for the column values by an application 265, but provide functionality at query execution time). A hidden column may represent a consent status for each row for a specific data processing activity. The DBMS 225 may assign a policy, and an associated role, to each processing activity, querying entity, or both based on a consent status defined by one or more data processing permits 260. The DBMS 225 may use one or more hidden columns in a database 230 to perform filtering at query execution time. For example, the DBMS 225 may filter out data records and/or data fields from query results if the consent status indicated by a hidden column is "false," while maintaining data records and/or data fields in the query results if the consent status indicated by the hidden column is "true." If a consent status is updated, the permits and fortification service 255 may update one or more corresponding data processing permits 260. Additionally, the updates may be pushed to the DBMS 225 based on the updated data processing permit(s) 260 to update access to specific rows, columns, or fields in a database 230.

Based on the query transformation, the encryption schemes implemented in the databases 230, the implemented UDFs 235, the consent statuses, or a combination of these techniques, the DBMS 225 may execute the encrypted query 280 on ciphertext to obtain ciphertext results 285 (e.g., without decrypting data to obtain plaintext in the DBMS 225). The DBMS 225 may return the ciphertext results 285 to the database proxy 205.

The database proxy 205 may decrypt the received ciphertext results 285. For example, using an encryption manager 215—which may be an example of an encryption manager 145 as described with reference to FIG. 1—and column-specific keys 250, permit keys, or some combination thereof, the database proxy 205 may decrypt the ciphertext results 285 to obtain plaintext results 290. In some cases, if the ciphertext results 285 include one or more values encrypted using OffBoard encryption, the database proxy 205 may decrypt the one or more values by leveraging a fortification service (e.g., the permits and fortification service 255). In some examples, the database proxy 205 may perform additional processing on the decrypted results (e.g., the plaintext results 290). For example, the database proxy 205 may use a plaintext processor 220 (e.g., a component implemented in hardware, software executed by a processor, firmware, or any combination thereof) to modify the plaintext results 290 (e.g., based on one or more data processing permits 260 or an application 265 requesting the results). The database proxy 205 may transmit the resulting plaintext results 290 to the application 265 (e.g., application 265-*b*) in response to the query 270.

Additionally, in some implementations, the system architecture 200 may provide mechanisms for satisfying consumer rights (e.g., user privacy rights defined by one or more data regulations). For example, the system architecture 200 may support deletion of private user data with strong guarantees. Deletion may be achieved using one or more techniques. In some examples, a DBMS 225 may perform direct deletion of the relevant data records (e.g., rows) in the various databases (e.g., database 230-*a* and database 230-*b*). Additionally or alternatively, a permits and fortification service 255 may effectively achieve deletion by deleting the permit keys used to produce OffBoard encryption identifiers for the relevant data records. By deleting the permit keys, the permit key-encrypted identifiers may be inaccessible, making the corresponding data records similarly inaccessible to querying. Additionally or alternatively, the DBMS 225 may effectively achieve deletion by setting all processing activity flags to "false." That is, the DBMS 225 may update one or more hidden columns in the various databases (e.g., database 230-*a* and database 230-*b*) to restrict access to the relevant data records (e.g., for all processing activities). In some cases, direct deletion of the data records may free up space in a database 230, while effective deletion using another method may significantly reduce the latency involved in complying with a user deletion request.

Figure 3:
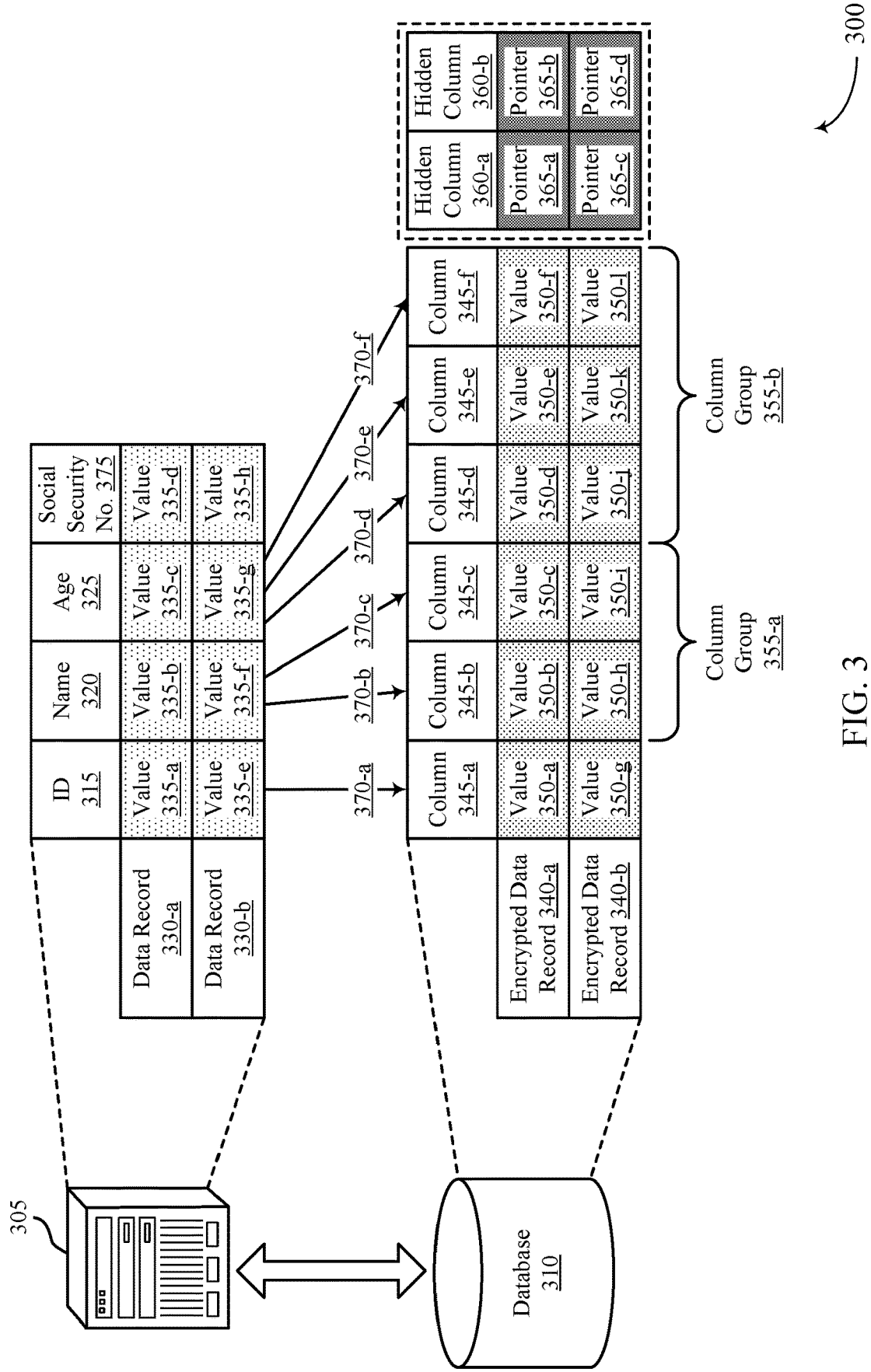
FIG. 3 illustrates an example of a database schema that supports managing queries with data processing permits in accordance with aspects of the present disclosure.

FIG. 3 illustrates an example of a database schema 300 that supports managing queries with data processing permits in accordance with aspects of the present disclosure. The database schema 300 may be implemented at a database 310, such as a database 110 or a database 230 described with reference to FIGS. 1 and 2. The database 310 may be managed by a DBMS, such as a relational DBMS. In some cases, the database schema 300 for the database 310 may be referred to as an encryption schema (e.g., based on the encryption schemes implemented in the database 310). The database 310 may be associated with a database proxy 305, which may be an example of a database proxy 105 or a database proxy 205 as described with reference to FIGS. 1 and 2. The database proxy 305 may manage storing and accessing data in the database 310, for example, based on the database schema 300.

The database proxy 305 may support running any queries on the database 310 based on the encryption schema of the database 310. As illustrated, the database proxy 305 may transform an insert query to support execution at the database 310. For example, the database proxy 305 may receive a dataset to store in the database 310 (e.g., as indicated by an insert query). The dataset may include data record 330-*a* and data record 330-*b*. Each data record 330 may include a number of data fields, such as an identifier 315, a name 320, an age 325, a social security number 375, or some combination of these or other relevant fields (e.g., for a "user" dataset). Data record 330-*a* may include plaintext value 335-*a* for the identifier 315, plaintext value 335-*b* for the name 320, plaintext value 335-*c* for the age 325, and plaintext value 335-*d* for the social security number 375. Similarly, data record 330-*b* may include plaintext value 335-*e* for the identifier 315, plaintext value 335-*f* for the name 320, plaintext value 335-*g* for the age 325, and plaintext value 335-*h* for the social security number 375.

The database proxy 305 may transform the insert query based on the encryption schema of the database 310. For example, each column in the plaintext dataset may map to one or more encrypted columns in a table in the database 310 according to the encryption schema. In some cases, a table name for the table in the database 310 may also be encrypted (e.g., based on a table name for the input dataset). Additionally or alternatively, column names may be encrypted in the database 310. This may further obfuscate the data stored in the database 310 for improved security.

As illustrated, plaintext data record 330-*a* may be stored in the database 310 as encrypted data record 340-*a*, and plaintext data record 330-*b* may be stored in the database 310 as encrypted data record 340-*b*. Each plaintext data field in the input dataset may map to zero, one, or multiple columns in the database 310. For example, based on data processing permits and the encryption schema of the database 310, the database proxy 305 may transform the insert query to store the plaintext dataset as ciphertext in the database 310. In the example illustrated in FIG. 3, the identifier 315 may map to encrypted column 345-*a*, the name 320 may map to encrypted columns 345-*b* and 345-*c*, and the age 325 may map to encrypted columns 345-*d*, 345-*e*, and 345-*f*. The database 310 may not have permission to store the social security numbers 375 (e.g., based on one or more data processing permits). As such, the social security numbers 375 may not be stored in the database 310, and the values 335-*d* and 335-*h* may not enter the database 310. Furthermore, the database proxy 305 may flush these values 335-*d* and 335-*h* from memory.

To support specific querying functionality in the database 310, the database proxy 305 may use specific encryption techniques 370 to encrypt the plaintext data fields into encrypted columns 345. For example, the database proxy 305 may encrypt the plaintext values 335-*a* and 335-*e* in the insert query using permit-based encryption 370-*a* (e.g., according to one or more data processing permits). Accordingly, the database proxy 305 may transform the insert query to insert ciphertext value 350-*a* in place of plaintext value 335-*a* and ciphertext value 350-g in place of plaintext value 335-*e*. The database proxy 305 may use a first permit key associated with a first data processing permit to encrypt plaintext value 335-*a* based on a first user corresponding to data record 330-*a* and may use a second permit key associated with a second data processing permit—and different from the first permit key—to encrypt plaintext value 335-*e* based on a second user corresponding to data record 330-*b*. Such an encrypted column 345-*a*, storing user identifiers encrypted based on permit identifiers, may support access to data in a corresponding encrypted data record 340 if a relevant data processing permit indicating the correct permit identifier exists. Otherwise, the database 310 may not access the corresponding encrypted data record 340, effectively revoking access or deleting the encrypted data record 340 based on the associated data processing permit and permit key.

The database proxy 305 may use DET 370-*b* to encrypt plaintext value 335-*b* into ciphertext value 350-*b* and plaintext value 335-*f* into ciphertext value 350-*h*. To support deterministic functionality, the database proxy 305 may use the same DET process (e.g., including a same column key) to encrypt both ciphertext values 350-*b* and 350-*h* in encrypted column 345-*b*. Additionally, the database proxy 305 may use SEARCH 370-*c* to encrypt plaintext value 335-*b* into ciphertext value 350-*c* and plaintext value 335-*f* into ciphertext value 350-*i*. Accordingly, encrypted columns 345-*b* and 345-*c* may both store ciphertext values 350 corresponding to the same plaintext data field. However, based on the different encryption schemes used to generate the ciphertext, encrypted columns 345-*b* and 345-*c* may be used to support different querying functionality. For example, if the database proxy 305 receives a query including a WHERE clause for name 320 (e.g., "WHERE name='Bob';"), the database proxy 305 may transform the query to operate on encrypted column 345-*b* (e.g., supporting WHERE operations based on using DET 370-*b*). Additionally, the database proxy 305 may transform the queried value using the same DET process (e.g., including the same column key) to query for the ciphertext value 350 in encrypted column 345-*b* corresponding to the queried value. As an example, if plaintext value 335-*f* is "Bob," the database 310 may store ciphertext value 350-*h* "DLiS;Q5" in encrypted column 345-*b* based on DET 370-*b*. Correspondingly, the database proxy 305 may transform the query clause "WHERE name='Bob';" to use a UDF supporting a WHERE operation for the ciphertext value "DLiS;Q5" on encrypted column 345-*b*. As such, without decrypting encrypted column 345-*b*, the database 310 may accurately execute WHERE query functionality. Similarly, if the database proxy 305 receives a query including a LIKE clause for name 320 (e.g., "WHERE name LIKE 'Al*';"), the database proxy 305 may transform the query to operate on encrypted column 345-c (e.g., supporting LIKE operations based on using SEARCH 370-c) and may transform the queried value using the same SEARCH process as encrypted column 345-c.

The database proxy 305 may further use DET 370-d (e.g., a different DET process than DET 370-b, for example, based on using a different column key) to encrypt plaintext value 335-c into ciphertext value 350-d and plaintext value 335-g into ciphertext value 350-j. The database proxy 305 may use OPE 370-e to encrypt plaintext value 335-c into ciphertext value 350-e and plaintext value 335-g into ciphertext value 350-k and may use HOM-SUM 370-f to encrypt plaintext value 335-c into ciphertext value 350-f and plaintext value 335-g into ciphertext value 350-l. As such, encrypted columns 345-d, 345-e, and 345-f may support different query functions for age 325. It is to be understood that the fields and encryption techniques 370 illustrated in FIG. 3 are given as examples, and any other data fields and encryption techniques 370 may be supported by the processes described herein.

In some examples, the database 310 may store encrypted columns 345 corresponding to the same plaintext column separately (e.g., both encrypted column 345-b and encrypted column 345-c exist as separate columns in the database 310). In some other examples, the database 310 may implement encryption onions. An encryption onion may involve using multiple layers of encryption on a single encrypted column 345 in the database 310 to support different query functionality at different layers of the encryption onion. For example, each column group 355 may correspond to a single encrypted column 345 stored in the database 310. Each column stored in the database 310 may be encrypted one or more times, starting with a least secure encryption scheme and progressing to a most secure encryption scheme. In some cases, the outermost level of encryption may satisfy a security level threshold for the database 310 (e.g., such as RND or DET). To perform query operations supported by deeper layers of encryption, one or more UDFs may be implemented to decrypt one or more layers of encryption for an encrypted column 345. In some examples, a UDF may decrypt a layer of an encrypted column 345 using an UPDATE COLUMN statement. In some other examples, a UDF may use a temporary table, a temporary column, a materialized view, a just view, or some combination thereof to decrypt a layer of an encrypted column 345 (e.g., based on a tradeoff between storage and compute costs, latency and security, or some combination thereof). However, the database 310 may refrain from implementing a UDF or layer decryption process that results in plaintext. For example, the database 310 may include a mechanism to prevent further decryption once the innermost encryption layer is reached.

Implementing encryption onions may improve the security of the data stored in the database 310. For example, as illustrated, encrypted column 345-a may be encrypted once, column group 355-a may correspond to an encrypted column 345 encrypted twice, and column group 355-b may correspond to an encrypted column 345 encrypted three times. As such, a single encrypted column 345 corresponding to column group 355-a may support the security level and functionality of DET 370-b while also supporting the functionality of SEARCH 370-c. Similarly, a single encrypted column 345 corresponding to column group 355-b may support the security level and functionality of DET 370-d while also supporting the functionality of OPE 370-e and the functionality of HOM-SUM 370-f.

The database schema 300 may further support hidden columns 360 to integrate data processing permits into row and column access control. A hidden column 360 may correspond to an encrypted column 345 or an entire encrypted data record 340. Each hidden column 360 may include a pointer 365 per row, where the pointer 365 references a table storing consent statuses. Such a table may be based on a set of data processing permits (e.g., managed by a permit system). A hidden column 360 may be associated with a specific processing activity, and may indicate whether the processing activity is consented to for each row (e.g., using the pointers 365, the reference tables, or both). For example, pointer 365-a may be an example of a key identifier pointing to a primary key in another table. The primary key in the other table may be associated with a up-to-date consent status for the user associated with encrypted data record 340-a and the processing activity associated with hidden column 360-a. If the current consent status indicated by pointer 365-a is "true," the processing activity for hidden column 360-a is consented to by the user associated with encrypted data record 340-a. However, if the current consent status indicated by pointer 365-a is "false," the processing activity for hidden column 360-a is not consented to for encrypted data record 340-a. As an example, hidden column 360-a may be linked to encrypted column 345-b. If the database proxy 305 executes a query on encrypted column 345-b in the database 310, the database 310 may use hidden column 360-a for filtering according to one or more policies and/or roles. For example, if pointer 365-a indicates "true" and pointer 365-c indicates "false," the database 310 may filter out value 350-h from the query results based on the consent status being "false." In some cases, hidden column 360-b and pointers 365-b and 365-d may similarly correspond to a particular encrypted column 345 or may correspond to all columns 345 for an encrypted data record 340. When storing data in the database 310, the database proxy 305 may further transform an insert query to handle inserting pointers 365 for all relevant hidden columns 360 in the database 310, for example, based on one or more data processing permits managed by a permit system.

Figure 4:
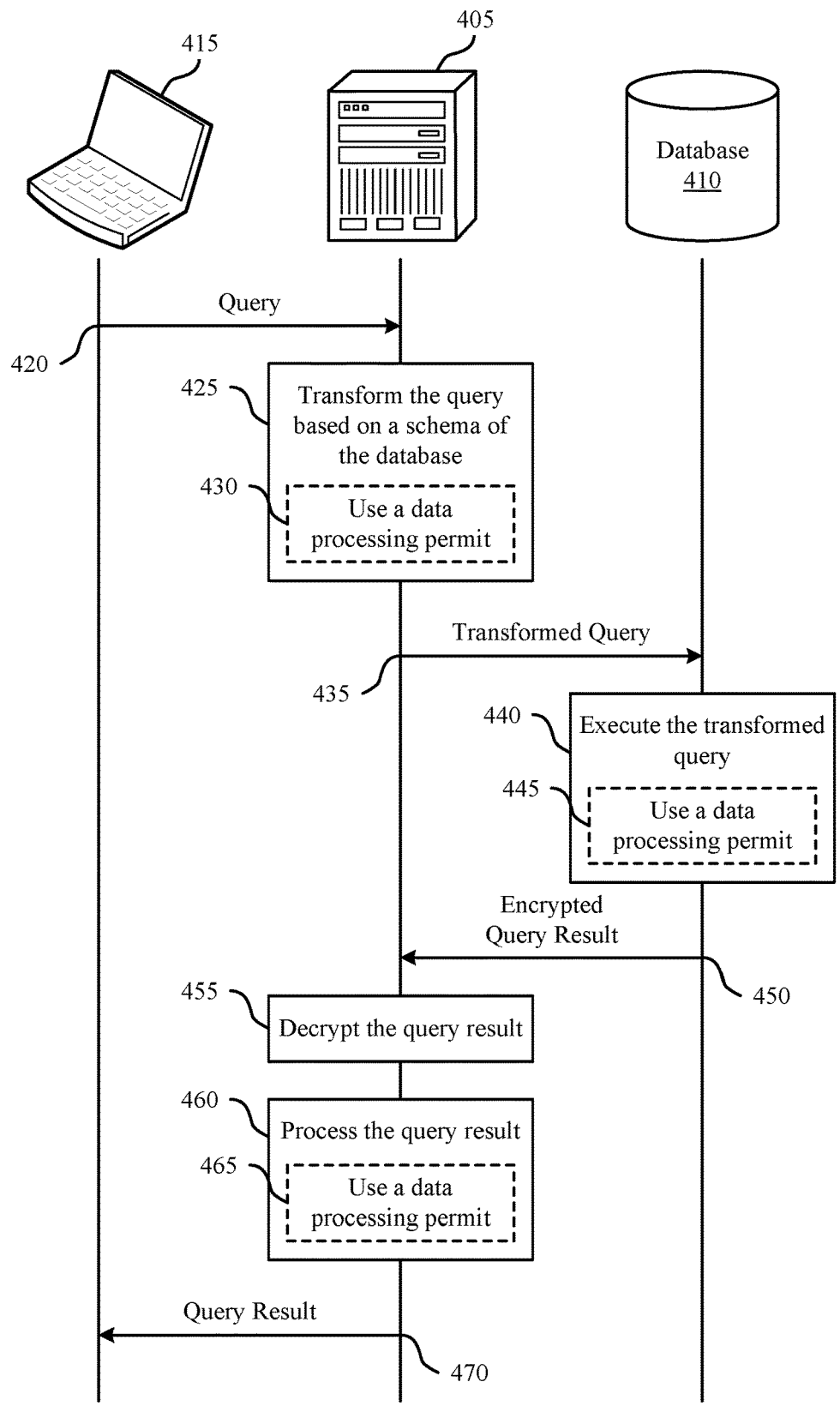
FIG. 4 illustrates an example of a process flow that supports managing queries with data processing permits in accordance with aspects of the present disclosure.

FIG. 4 illustrates an example of a process flow 400 that supports managing queries with data processing permits in accordance with aspects of the present disclosure. The process flow 400 may include a database proxy 405, a database 410, and a user device 415 (e.g., running an application), which may be examples of the corresponding devices described with reference to FIGS. 1 through 3. A database system supporting data processing may include the database proxy 405 and the database 410. The database proxy 405 and the database 410 may implement a number of techniques to support running queries on encrypted data and integrating data processing permits into query execution. Alternative examples of the following may be implemented, where some steps are performed in a different order than described or are not performed at all. In some cases, steps may include additional features not mentioned below, or further steps may be added.

At 420, the database proxy 405 may receive a query (e.g., from an application running at the user device 415). The query may include an indication of data associated with the database 410 and privacy metadata indicating a data processing activity for using the data.

At 425, the database proxy 405 may transform the query based on an encryption schema (e.g., a database schema) of the database 410. In some examples, transforming the query may involve using a data processing permit at 430. For example, the query may be an example of a request for data stored in the database, and the privacy metadata may further include a user identifier associated with the request for data. In such an example, the database proxy 405 may identify a data processing permit applicable to the processing activity and the user identifier and may encrypt the user identifier with a permit key associated with the identified data processing permit. The database proxy 405 may transform the query to include a SELECT statement indicating the encrypted user identifier.

At 435, the database proxy 405 may send the transformed query to the database 410 for execution. At 440, the database 410 may execute the transformed query. In some examples, executing the transformed query may involve using a data processing permit at 445, or may otherwise be based on a data processing permit (e.g., based on the transformed query depending on a data processing permits, based on query results being processed based on a data processing permit, or some combination thereof). For example, if the transformed query includes a SELECT statement indicating an encrypted user identifier, the database 410 may store encrypted user identifiers in a column supporting execution of SELECT statements in order to provide or restrict access to a row in the database 410. Additionally or alternatively, the query may include a request for data stored in the database 410, and the database 410 may identify a consent status for a data field associated with the data processing activity, where the consent status is based on the relevant data processing permit. The database 410 may retrieve or refrain from retrieving the data from the database 410 based on the identified consent status. In some cases, the consent status may be indicated by a hidden column stored in the database 410. The data may be encrypted at rest in the database 410, and the data may remain encrypted during execution of the transformed query.

At 450, the database 410 may return an encrypted query result in response to the transformed query. The database proxy 405 may receive the ciphertext query result based on executing the transformed query at the database 410 and, at 455, may decrypt the ciphertext query result to obtain a plaintext query result (e.g., based on the encryption schema of the database 410).

In some cases, at 460, the database proxy 405 may perform one or more additional processes on the plaintext query result. For example, the database proxy 405 may modify the query result (e.g., filter out one or more data records, aggregate data, etc.). In some examples, processing the query result may involve using a data processing permit at 465. For example, the database proxy 405 may modify the query result based on a data processing permit applicable to the data processing activity. At 470, the database proxy 405 may transmit, to the user device 415 running the querying application, the plaintext query result in response to the query.

Figure 5:
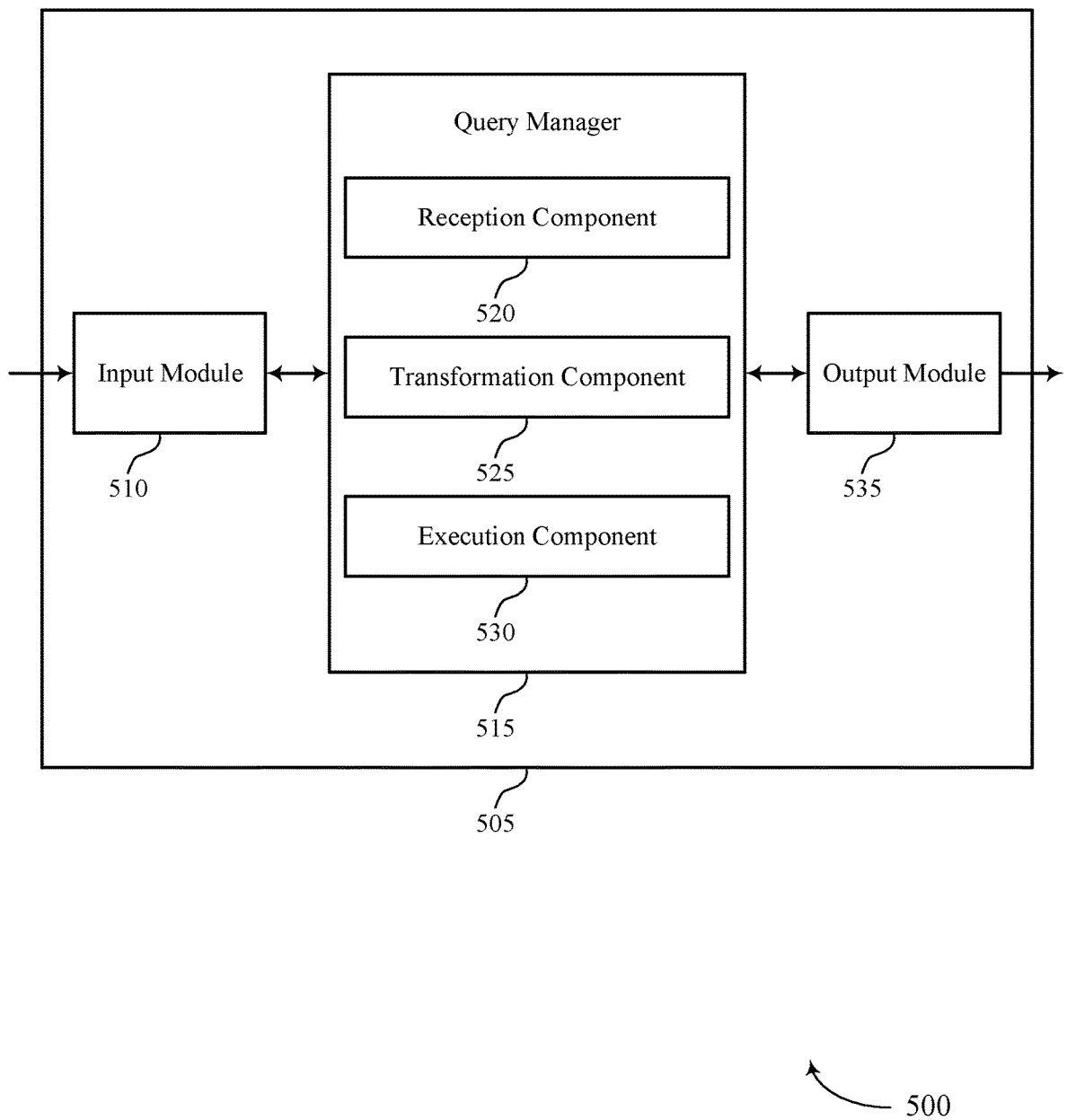
FIG. 5 shows a block diagram of an apparatus that supports managing queries with data processing permits in accordance with aspects of the present disclosure.

FIG. 5 shows a block diagram 500 of an apparatus 505 that supports managing queries with data processing permits in accordance with aspects of the present disclosure. The apparatus 505 may include an input module 510, a query manager 515, and an output module 535. The apparatus 505 may also include a processor. Each of these components may be in communication with one another (e.g., via one or more buses). In some cases, the apparatus 505 may be an example of a user terminal, a server, or a system containing multiple computing devices. For example, the apparatus 505 may be an example of a database system including a database proxy and a database.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the query manager 515 to support managing queries with data processing permits. In some cases, the input module 510 may be a component of an input/output (I/O) controller 715 as described with reference to FIG. 7.

The query manager 515 may include a reception component 520, a transformation component 525, and an execution component 530. The query manager 515 may be an example of aspects of the query manager 605 or 710 described with reference to FIGS. 6 and 7.

The query manager 515 and/or at least some of its various sub-components may be implemented in hardware, software executed by a processor, firmware, or any combination thereof. If implemented in software executed by a processor, the functions of the query manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The query manager 515 and/or at least some of its various sub-components may be physically located at various positions, including being distributed such that portions of functions are implemented at different physical locations by one or more physical devices. In some examples, the query manager 515 and/or at least some of its various sub-components may be a separate and distinct component in accordance with various aspects of the present disclosure. In other examples, the query manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The query manager 515 may perform operations at a database proxy and a database of a database system. The reception component 520 may receive, at the database proxy, a query including an indication of data associated with the database and privacy metadata indicating a data processing activity for using the data. The transformation component 525 may transform, at the database proxy, the query based on an encryption schema of the database. The execution component 530 may execute, at the database, the transformed query, where executing the transformed query is based on a data processing permit stored for the database system and applicable to the data processing activity.

The output module 535 may manage output signals for the apparatus 505. For example, the output module 535 may receive signals from other components of the apparatus 505, such as the query manager 515, and may transmit these signals to other components or devices. In some specific examples, the output module 535 may transmit output signals for display in a user interface, for storage in a database or data store, for further processing at a server or server cluster, or for any other processes at any number of devices or systems. In some cases, the output module 535 may be a component of an I/O controller 715 as described with reference to FIG. 7.

Figure 6:
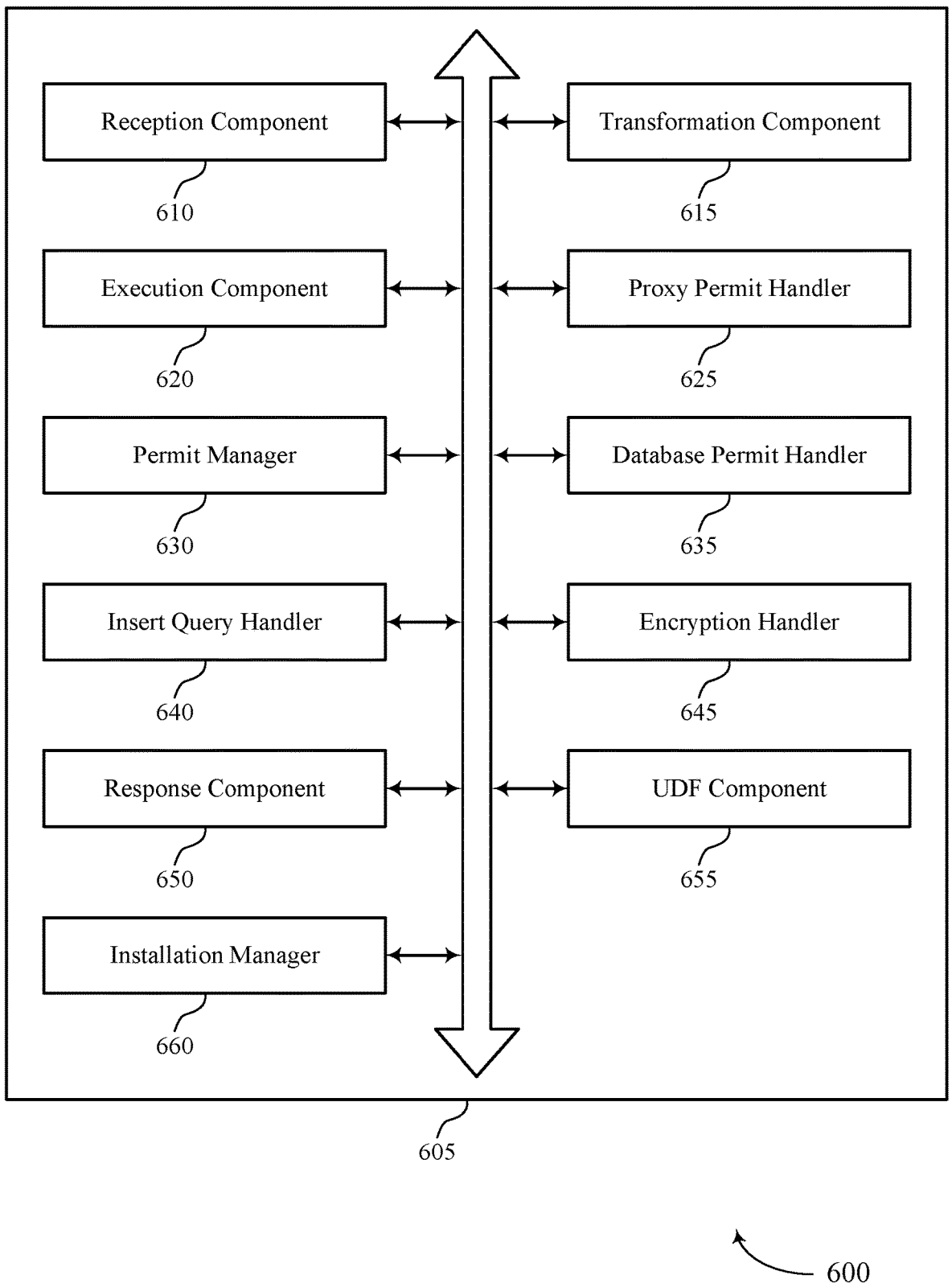
FIG. 6 shows a block diagram of a query manager that supports managing queries with data processing permits in accordance with aspects of the present disclosure.

FIG. 6 shows a block diagram 600 of a query manager 605 that supports managing queries with data processing permits in accordance with aspects of the present disclosure. The query manager 605 may be an example of aspects of a query manager 515 or a query manager 710 described herein. The query manager 605 may include a reception component 610, a transformation component 615, an execution component 620, a proxy permit handler 625, a permit manager 630, a database permit handler 635, an insert query handler 640, an encryption handler 645, a response component 650, a UDF component 655, and an installation manager 660. Each of these modules may communicate, directly or indirectly, with one another (e.g., via one or more buses). The query manager 605 may be implemented at a database system including a database proxy and a database.

The reception component 610 may receive, at the database proxy, a query including an indication of data associated with the database and privacy metadata indicating a data processing activity for using the data. The transformation component 615 may transform, at the database proxy, the query based on an encryption schema of the database. The execution component 620 may execute, at the database, the transformed query, where executing the transformed query is based on a data processing permit stored for the database system and applicable to the data processing activity.

In some examples, the query may include a request for the data stored in the database and a user identifier associated with the request for the data. In some such examples, transforming the query may involve the proxy permit handler 625 identifying the data processing permit applicable to the data processing activity and the user identifier and encrypting the user identifier with a permit key associated with the identified data processing permit, where the transformed query includes a select statement indicating the encrypted user identifier. In some cases, the reception component 610 may receive, at the database proxy, a second query including a second request for the data stored in the database and second privacy metadata indicating a second data processing activity for using the data and a second user identifier associated with the second request for the data. In some such cases, the proxy permit handler 625 may fail to identify a second data processing permit applicable to both the second data processing activity and the second user identifier. The proxy permit handler 625 may refrain from retrieving the data in response to the second query based on failing to identify the second data processing permit.

In some examples, the permit manager 630 may receive a legitimizing reason for the user identifier to access the data for the data processing activity. In some such examples, the permit manager 630 may generate the data processing permit applicable to the data processing activity and the user identifier based on receiving the legitimizing reason, may encrypt the user identifier with the permit key associated with the data processing permit based on receiving the legitimizing reason, and may store, in the database, the encrypted user identifier with a relation to the data stored in the database. In some cases, the encrypted user identifier is stored in a column in the database, the column supports executing the select statement for the query in the database, and the encrypted user identifier provides access to a row in the database including the data.

In some examples, the query may include a request for the data stored in the database. In some such examples, executing the transformed query may involve the database permit handler 635 identifying, in the database, a consent status for a data field based on the data processing activity, where the consent status is based on the data processing permit, and retrieving the data from the database based on the identified consent status. In some examples, the database permit handler 635 may filter a data column of the database, a data row of the database, or a combination thereof based on a hidden consent column of the database. Additionally or alternatively, the database permit handler 635 may access a table in the database based on a reference stored with the data, where the consent status is identified based on a value stored in the table, the data processing activity, the data processing permit, or a combination thereof.

In some examples, executing the transformed query may involve the proxy permit handler 625 receiving, at the database proxy, a query result based on executing the transformed query at the database and modifying, at the database proxy, the query result based on the data processing permit applicable to the data processing activity. In some examples, the modifying may involve the proxy permit handler 625 filtering the query result based on the data processing permit.

In some examples, the query may be an example of an insert query for the data, and the insert query handler 640 may identify a legitimizing reason for storing the data based on the data processing permit, where the query is transformed to store the data at the database according to the encryption schema of the database based on the legitimizing reason for storing the data.

The encryption handler 645 may receive, at the database proxy, a ciphertext query result based on executing the transformed query at the database and may decrypt, at the database proxy, the ciphertext query result to obtain a plaintext query result based on the encryption schema of the database. In some examples, the query may be received from a user device, and the response component 650 may transmit, to the user device, the plaintext query result in response to the query.

In some cases, the data may be encrypted at rest in the database, and the data may remain encrypted in the database during execution of the transformed query. In some cases, the data is stored in the database in a set of columns using a set of respective encryption schemes, where the database executes the transformed query on a column of the set of columns based on a query function for the transformed query supported by the column according to a respective encryption scheme for the column. In some other cases, the data is stored in the database in a single column using a set of layered encryption schemes. The database may decrypt one or more layers of the set of layered encryption schemes based on a query function for the transformed query and may execute the transformed query on the single column based on the decrypted one or more layers of the set of layered encryption schemes.

In some examples, transforming the query may involve the UDF component 655 performing one or more calls to one or more UDFs for the database system based on a clause in the query, an operator in the query, the encryption schema of the database, or a combination thereof The installation manager 660 may install the database proxy for the database system. In some examples, the installation manager 660 may determine, at the database proxy, an initial schema of the database and may update the initial schema of the database to the encryption schema of the database based on the initial schema of the database and a set of data processing permits associated with installing the database proxy.

Figure 7:
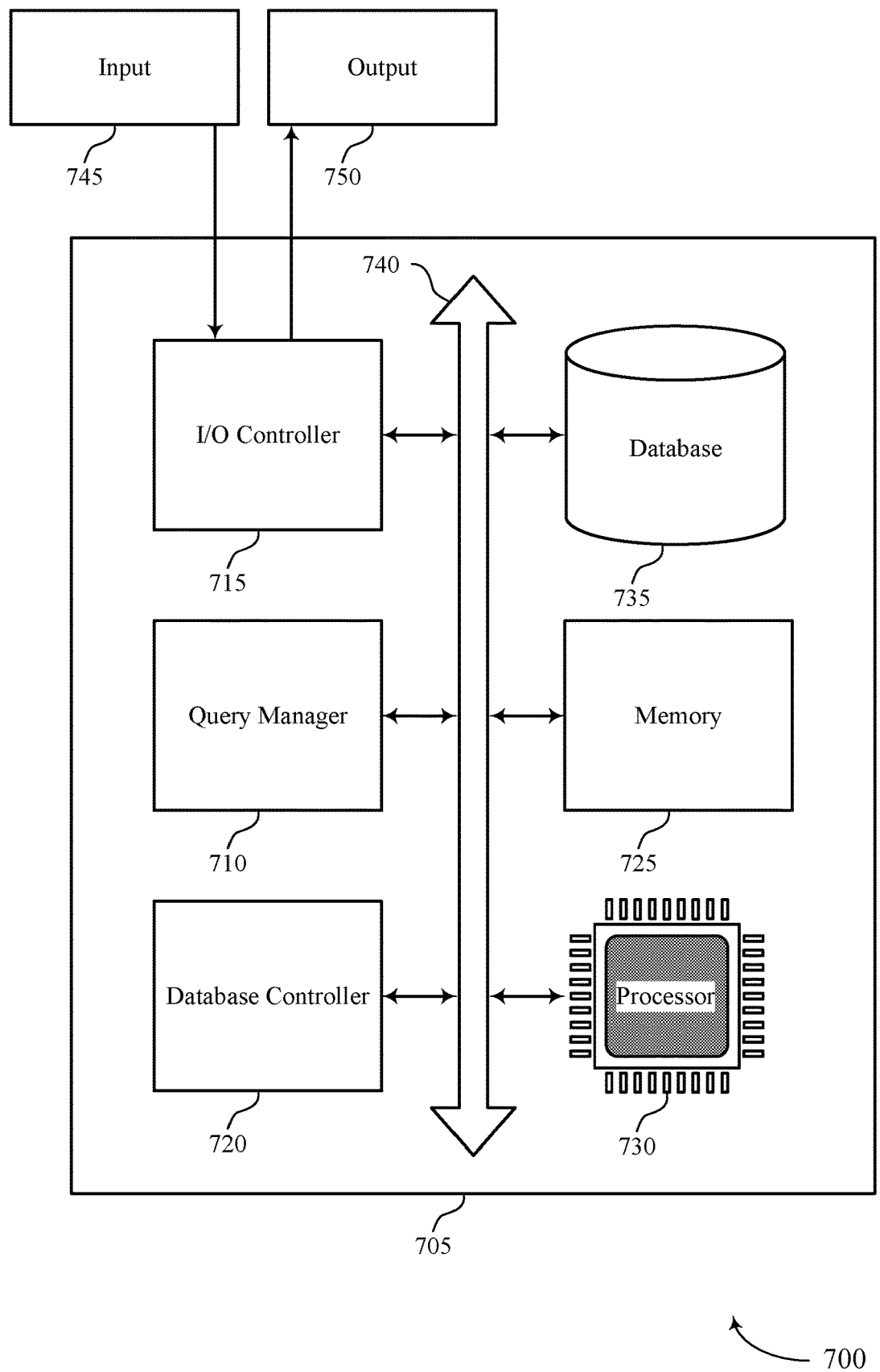
FIG. 7 shows a diagram of a system including a device that supports managing queries with data processing permits in accordance with aspects of the present disclosure.

FIG. 7 shows a diagram of a system 700 including a device 705 that supports managing queries with data processing permits in accordance with aspects of the present disclosure. The device 705 may be an example of or include the components of an application server or an apparatus 505 as described herein. The device 705 may include components for bi-directional data communications including components for transmitting and receiving communications, including a query manager 710, an I/O controller 715, a database controller 720, memory 725, a processor 730, and a database 735. These components may be in electronic communication via one or more buses (e.g., bus 740).

The query manager 710 may be an example of a query manager 515 or 605 as described herein. For example, the query manager 710 may perform any of the methods or processes described above with reference to FIGS. 5 and 6. In some cases, the query manager 710 may be implemented in hardware, software executed by a processor, firmware, or any combination thereof. For example, the query manager 710 at a database proxy, a database 735, or some combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting managing queries with data processing permits).

Figure 8:
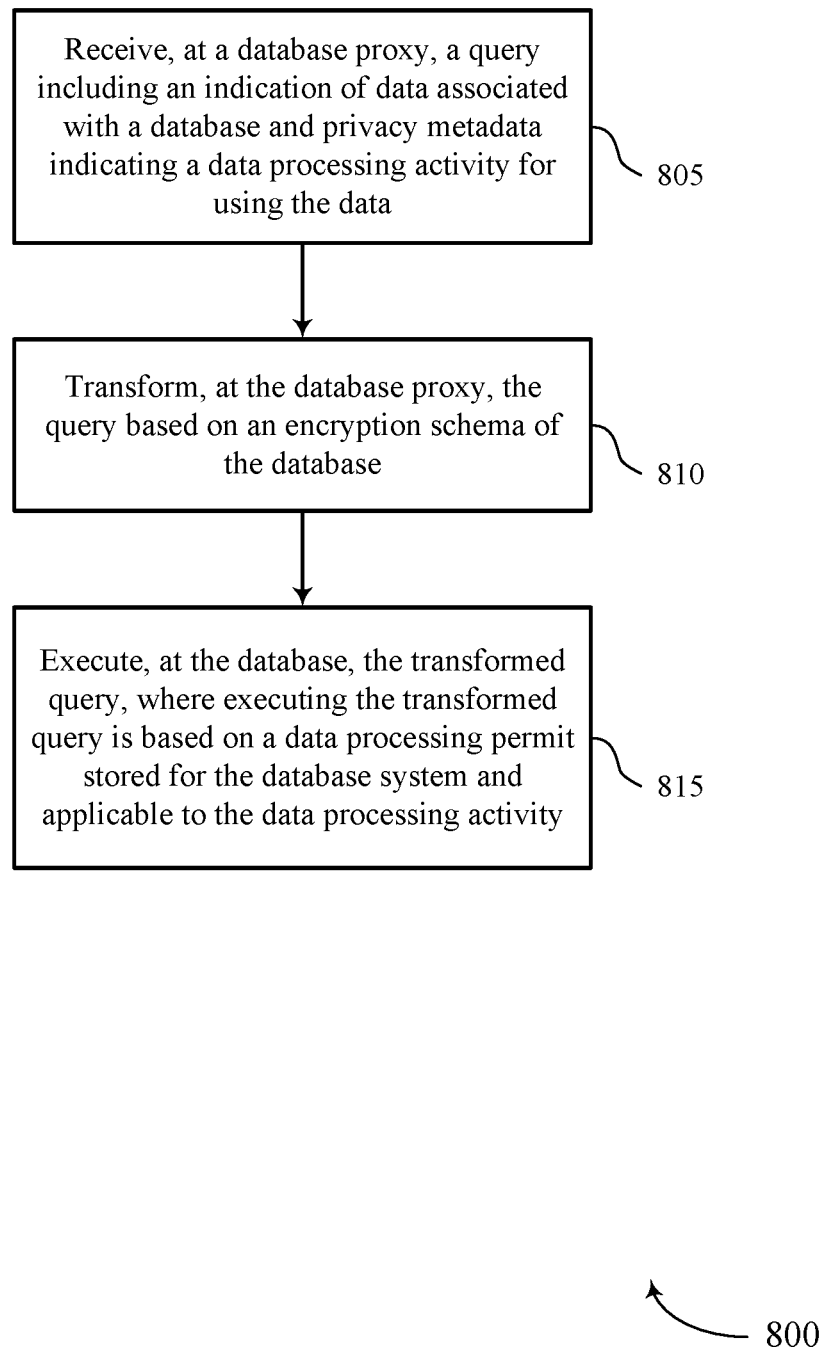
FIGS. 8 through 11 show flowcharts illustrating methods that support managing queries with data processing permits in accordance with aspects of the present disclosure.

FIG. 8 shows a flowchart illustrating a method 800 that supports managing queries with data processing permits in accordance with aspects of the present disclosure. The operations of method 800 may be implemented by a system (e.g., a single server, a server cluster, an application server, a database server, a database system, a cloud-based server, a virtual machine, a container, or any other device or system supporting query management) or its components as described herein. For example, the operations of method 800 may be performed by a query manager as described with reference to FIGS. 5 through 7. In some examples, a system may execute a set of instructions to control the functional elements of the application server to perform the functions described below. Additionally or alternatively, a system may perform aspects of the functions described below using special-purpose hardware.

At 805, the system (e.g., a database system) may receive, at a database proxy, a query including an indication of data associated with a database and privacy metadata indicating a data processing activity for using the data. The operations of 805 may be performed according to the methods described herein. In some examples, aspects of the operations of 805 may be performed by a reception component as described with reference to FIGS. 5 through 7.

At 810, the system may transform, at the database proxy, the query based on an encryption schema of the database. The operations of 810 may be performed according to the methods described herein. In some examples, aspects of the operations of 810 may be performed by a transformation component as described with reference to FIGS. 5 through 7.

At 815, the system may execute, at the database, the transformed query, where executing the transformed query is based on a data processing permit stored for the database system and applicable to the data processing activity. The operations of 815 may be performed according to the methods described herein. In some examples, aspects of the operations of 815 may be performed by an execution component as described with reference to FIGS. 5 through 7.

Figure 9:
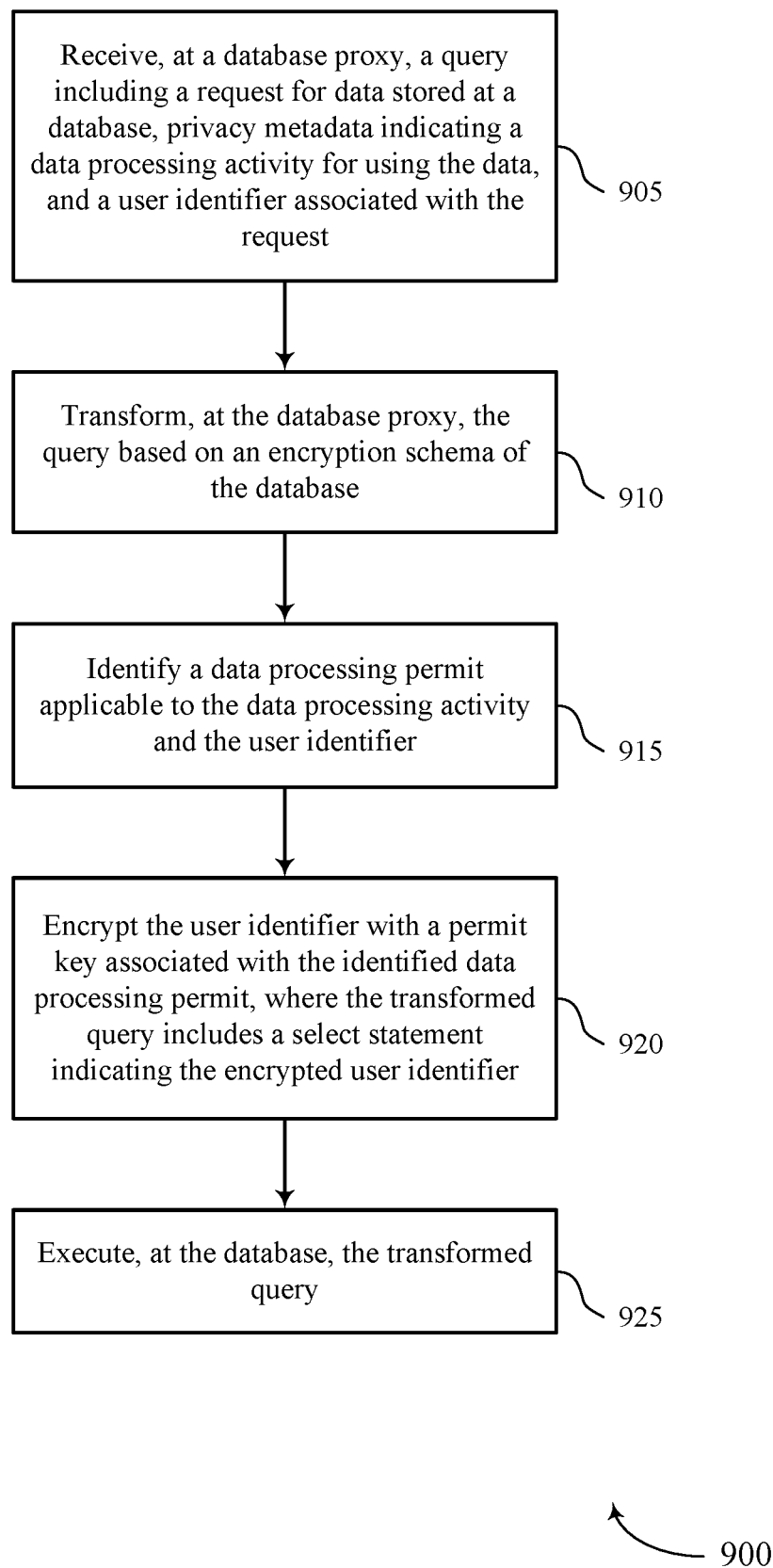

FIG. 9 shows a flowchart illustrating a method 900 that supports managing queries with data processing permits in accordance with aspects of the present disclosure. The operations of method 900 may be implemented by a system (e.g., a database system) or its components as described herein. For example, the operations of method 900 may be performed by a query manager as described with reference to FIGS. 5 through 7. In some examples, a system may execute a set of instructions to control the functional elements of the application server to perform the functions described below. Additionally or alternatively, a system may perform aspects of the functions described below using special-purpose hardware.

At 905, the system (e.g., a database system) may receive, at a database proxy, a query including an indication of data associated with a database and privacy metadata indicating a data processing activity for using the data. The operations of 905 may be performed according to the methods described herein. In some examples, aspects of the operations of 905 may be performed by a reception component as described with reference to FIGS. 5 through 7.

At 910, the system may transform, at the database proxy, the query based on an encryption schema of the database. In some cases, the received query may include a request for data stored at the database and a user identifier associated with the request. In some such cases, transforming the query may involve 915 and 920. The operations of 910 may be performed according to the methods described herein. In some examples, aspects of the operations of 910 may be performed by a transformation component as described with reference to FIGS. 5 through 7.

At 915, the system may identify the data processing permit applicable to the data processing activity and the user identifier. The operations of 915 may be performed according to the methods described herein. In some examples, aspects of the operations of 915 may be performed by a proxy permit handler as described with reference to FIGS. 5 through 7.

At 920, the system may encrypt the user identifier with a permit key associated with the identified data processing permit, where the transformed query includes a select statement indicating the encrypted user identifier. The operations of 920 may be performed according to the methods described herein. In some examples, aspects of the operations of 920 may be performed by a proxy permit handler as described with reference to FIGS. 5 through 7.

At 925, the system may execute, at the database, the transformed query. The operations of 925 may be performed according to the methods described herein. In some examples, aspects of the operations of 925 may be performed by an execution component as described with reference to FIGS. 5 through 7.

Figure 10:
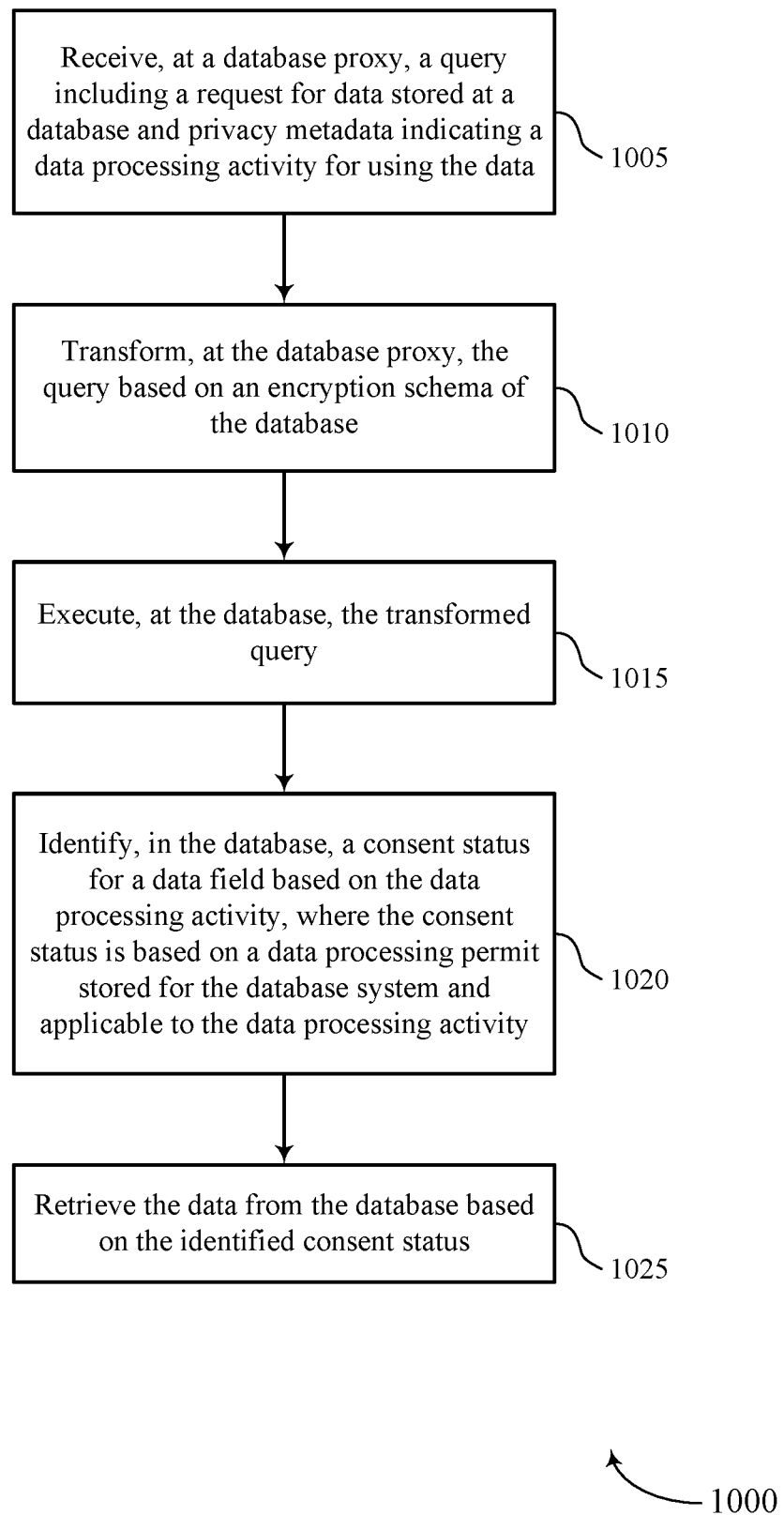

FIG. 10 shows a flowchart illustrating a method 1000 that supports managing queries with data processing permits in accordance with aspects of the present disclosure. The operations of method 1000 may be implemented by a system (e.g., a database system) or its components as described herein. For example, the operations of method 1000 may be performed by a query manager as described with reference to FIGS. 5 through 7. In some examples, a system may execute a set of instructions to control the functional elements of the application server to perform the functions described below. Additionally or alternatively, a system may perform aspects of the functions described below using special-purpose hardware.

At 1005, the system (e.g., a database system) may receive, at a database proxy, a query including an indication of data associated with a database and privacy metadata indicating a data processing activity for using the data. The operations of 1005 may be performed according to the methods described herein. In some examples, aspects of the operations of 1005 may be performed by a reception component as described with reference to FIGS. 5 through 7.

At 1010, the system may transform, at the database proxy, the query based on an encryption schema of the database. The operations of 1010 may be performed according to the methods described herein. In some examples, aspects of the operations of 1010 may be performed by a transformation component as described with reference to FIGS. 5 through 7.

At 1015, the system may execute, at the database, the transformed query, where executing the transformed query is based on a data processing permit stored for the database system and applicable to the data processing activity. For example, the query may include a request for data stored in the database, and executing the transformed query may involve 1020 and 1025. The operations of 1015 may be performed according to the methods described herein. In some examples, aspects of the operations of 1015 may be performed by an execution component as described with reference to FIGS. 5 through 7.

At 1020, the system may identify, in the database, a consent status for a data field based on the data processing activity, where the consent status is based on the data processing permit. The operations of 1020 may be performed according to the methods described herein. In some examples, aspects of the operations of 1020 may be performed by a database permit handler as described with reference to FIGS. 5 through 7.

At 1025, the system may retrieve the data from the database based on the identified consent status. The operations of 1025 may be performed according to the methods described herein. In some examples, aspects of the operations of 1025 may be performed by a database permit handler as described with reference to FIGS. 5 through 7.

Figure 11:
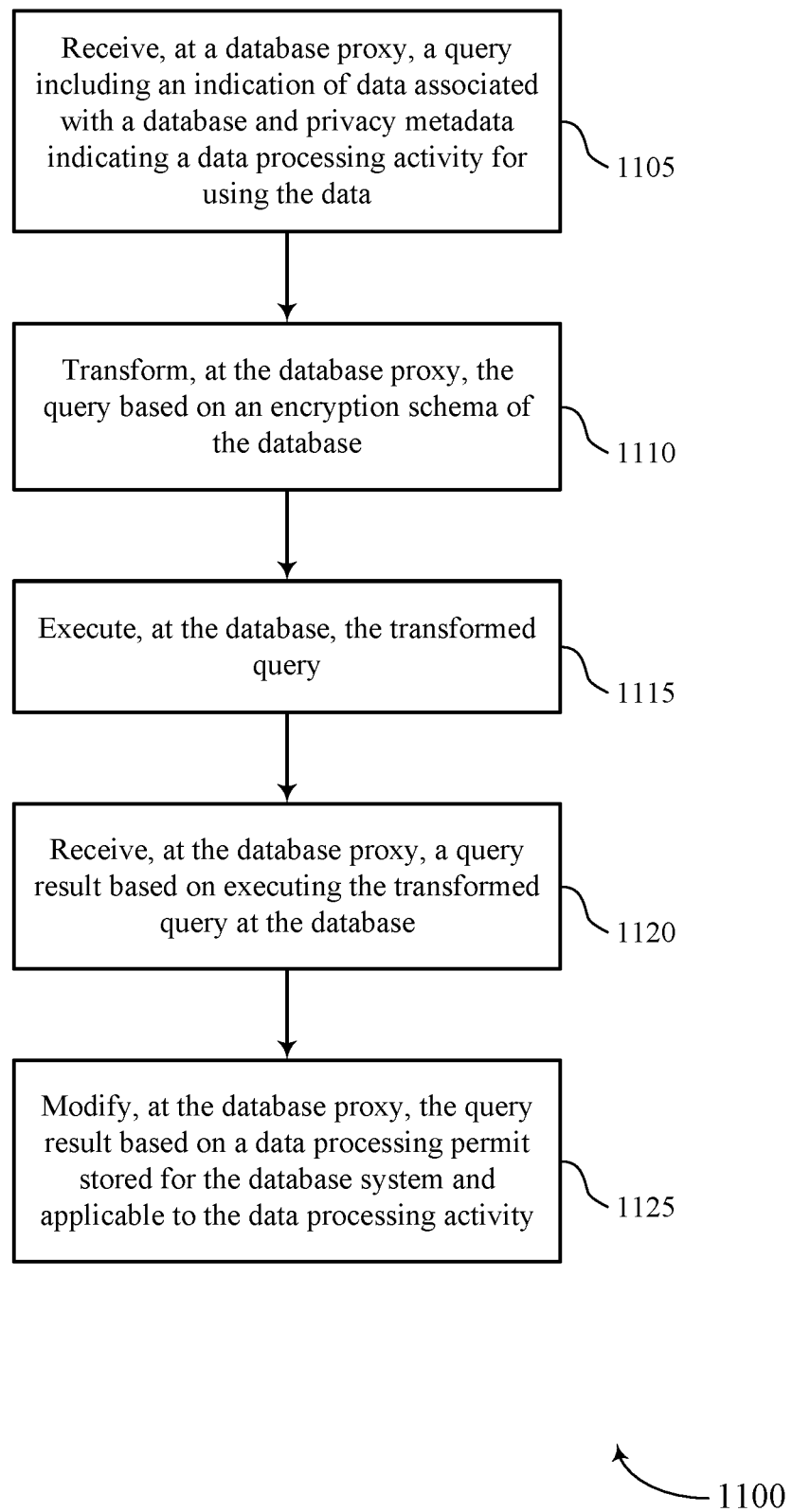

FIG. 11 shows a flowchart illustrating a method 1100 that supports managing queries with data processing permits in accordance with aspects of the present disclosure. The operations of method 1100 may be implemented by a system (e.g., a database system) or its components as described herein. For example, the operations of method 1100 may be performed by a query manager as described with reference to FIGS. 5 through 7. In some examples, a system may execute a set of instructions to control the functional elements of the application server to perform the functions described below. Additionally or alternatively, a system may perform aspects of the functions described below using special-purpose hardware.

At 1105, the system (e.g., a database system) may receive, at a database proxy, a query including an indication of data associated with a database and privacy metadata indicating a data processing activity for using the data. The operations of 1105 may be performed according to the methods described herein. In some examples, aspects of the operations of 1105 may be performed by a reception component as described with reference to FIGS. 5 through 7.

At 1110, the system may transform, at the database proxy, the query based on an encryption schema of the database. The operations of 1110 may be performed according to the methods described herein. In some examples, aspects of the operations of 1110 may be performed by a transformation component as described with reference to FIGS. 5 through 7.

At 1115, the system may execute, at the database, the transformed query. The operations of 1115 may be performed according to the methods described herein. In some examples, aspects of the operations of 1115 may be performed by an execution component as described with reference to FIGS. 5 through 7.

At 1120, the system may receive, at the database proxy, a query result based on executing the transformed query at the database. The operations of 1120 may be performed according to the methods described herein. In some examples, aspects of the operations of 1120 may be performed by a proxy permit handler as described with reference to FIGS. 5 through 7.

At 1125, the system may modify, at the database proxy, the query result based on a data processing permit stored for the database system and applicable to the data processing activity. The operations of 1125 may be performed according to the methods described herein. In some examples, aspects of the operations of 1125 may be performed by a proxy permit handler as described with reference to FIGS. 5 through 7.

A method for data processing at a database system including a database proxy and a database is described. The method may include receiving, at the database proxy, a query including an indication of data associated with the database and privacy metadata indicating a data processing activity for using the data, transforming, at the database proxy, the query based on an encryption schema of the database, and executing, at the database, the transformed query, where executing the transformed query is based on a data processing permit stored for the database system and applicable to the data processing activity.

An apparatus for data processing at a database system including a database proxy and a database is described. The apparatus may include a processor, memory coupled with the processor, and instructions stored in the memory. The instructions may be executable by the processor to cause the apparatus to receive, at the database proxy, a query including an indication of data associated with the database and privacy metadata indicating a data processing activity for using the data, transform, at the database proxy, the query based on an encryption schema of the database, and execute, at the database, the transformed query, where executing the transformed query is based on a data processing permit stored for the database system and applicable to the data processing activity.

Another apparatus for data processing at a database system including a database proxy and a database is described. The apparatus may include means for receiving, at the database proxy, a query including an indication of data associated with the database and privacy metadata indicating a data processing activity for using the data, transforming, at the database proxy, the query based on an encryption schema of the database, and executing, at the database, the transformed query, where executing the transformed query is based on a data processing permit stored for the database system and applicable to the data processing activity.

A non-transitory computer-readable medium storing code for data processing at a database system including a database proxy and a database is described. The code may include instructions executable by a processor to receive, at the database proxy, a query including an indication of data associated with the database and privacy metadata indicating a data processing activity for using the data, transform, at the database proxy, the query based on an encryption schema of the database, and execute, at the database, the transformed query, where executing the transformed query is based on a data processing permit stored for the database system and applicable to the data processing activity.

In some examples of the method, apparatuses, and non-transitory computer-readable medium described herein, the query may include a request for the data stored in the database and a user identifier associated with the request for the data, and the transforming may include operations, features, means, or instructions for identifying the data processing permit applicable to the data processing activity and the user identifier and encrypting the user identifier with a permit key associated with the identified data processing permit, where the transformed query includes a select statement indicating the encrypted user identifier.

Some examples of the method, apparatuses, and non-transitory computer-readable medium described herein may further include operations, features, means, or instructions for receiving a legitimizing reason for the user identifier to access the data for the data processing activity, generating the data processing permit applicable to the data processing activity and the user identifier based on receiving the legitimizing reason, encrypting the user identifier with the permit key associated with the data processing permit based on receiving the legitimizing reason, and storing, in the database, the encrypted user identifier with a relation to the data stored in the database.

In some examples of the method, apparatuses, and non-transitory computer-readable medium described herein, the encrypted user identifier may be stored in a column in the database, the column supports executing the select statement for the query in the database, and the encrypted user identifier provides access to a row in the database including the data.

Some examples of the method, apparatuses, and non-transitory computer-readable medium described herein may further include operations, features, means, or instructions for receiving, at the database proxy, a second query including a second request for the data stored in the database and second privacy metadata indicating a second data processing activity for using the data and a second user identifier associated with the second request for the data, failing to identify a second data processing permit applicable to both the second data processing activity and the second user identifier, and refraining from retrieving the data in response to the second query based on failing to identify the second data processing permit.

In some examples of the method, apparatuses, and non-transitory computer-readable medium described herein, the query may include a request for the data stored in the database, and the executing the transformed query may include operations, features, means, or instructions for identifying, in the database, a consent status for a data field based on the data processing activity, where the consent status may be based on the data processing permit, and retrieving the data from the database based on the identified consent status.

Some examples of the method, apparatuses, and non-transitory computer-readable medium described herein may further include operations, features, means, or instructions for filtering a data column of the database, a data row of the database, or a combination thereof based on a hidden consent column of the database.

Some examples of the method, apparatuses, and non-transitory computer-readable medium described herein may further include operations, features, means, or instructions for accessing a table in the database based on a reference stored with the data, where the consent status may be identified based on a value stored in the table, the data processing activity, the data processing permit, or a combination thereof.

In some examples of the method, apparatuses, and non-transitory computer-readable medium described herein, executing the transformed query further may include operations, features, means, or instructions for receiving, at the database proxy, a query result based on executing the transformed query at the database and modifying, at the database proxy, the query result based on the data processing permit applicable to the data processing activity.

In some examples of the method, apparatuses, and non-transitory computer-readable medium described herein, the modifying further may include operations, features, means, or instructions for filtering the query result based on the data processing permit.

In some examples of the method, apparatuses, and non-transitory computer-readable medium described herein, the query may be an example of an insert query for the data and the method, apparatuses, and non-transitory computer-readable medium described herein may further include operations, features, means, or instructions for identifying a legitimizing reason for storing the data based on the data processing permit, where the query may be transformed to store the data at the database according to the encryption schema of the database and based on the legitimizing reason for storing the data.

Some examples of the method, apparatuses, and non-transitory computer-readable medium described herein may further include operations, features, means, or instructions for receiving, at the database proxy, a ciphertext query result based on executing the transformed query at the database and decrypting, at the database proxy, the ciphertext query result to obtain a plaintext query result based on the encryption schema of the database.

In some examples of the method, apparatuses, and non-transitory computer-readable medium described herein, the query may be received from a user device. Some examples of the method, apparatuses, and non-transitory computer-readable medium described herein may further include operations, features, means, or instructions for transmitting, to the user device, the plaintext query result in response to the query.

In some examples of the method, apparatuses, and non-transitory computer-readable medium described herein, the data may be encrypted at rest in the database, and the data may be encrypted in the database during execution of the transformed query.

In some examples of the method, apparatuses, and non-transitory computer-readable medium described herein, transforming the query further may include operations, features, means, or instructions for performing one or more calls to one or more UDFs for the database system based on a clause in the query, an operator in the query, the encryption schema of the database, or a combination thereof.

In some examples of the method, apparatuses, and non-transitory computer-readable medium described herein, the data may be stored in the database in a set of columns using a set of respective encryption schemes, and the database may execute the transformed query on a column of the set of columns based on a query function for the transformed query supported by the column according to a respective encryption scheme for the column.

In some examples of the method, apparatuses, and non-transitory computer-readable medium described herein, the data may be stored in the database in a single column using a set of layered encryption schemes, the database may decrypt one or more layers of the set of layered encryption schemes based on a query function for the transformed query, and the database may execute the transformed query on the single column based on the decrypted one or more layers of the set of layered encryption schemes.

Some examples of the method, apparatuses, and non-transitory computer-readable medium described herein may further include operations, features, means, or instructions for installing the database proxy for the database system, determining, at the database proxy, an initial schema of the database, and updating the initial schema of the database to the encryption schema of the database based on the initial schema of the database and a set of data processing permits associated with installing the database proxy.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a database system comprising a database proxy and a database, the method comprising:
   receiving, at the database proxy, a query associated with a user and comprising an indication of data associated with the database, wherein the query further comprises privacy metadata indicating a data processing activity for using the data;
   identifying a data processing permit stored for the database system that supports both the query and at least a subset of the data indicated by the query based at least in part on the data processing permit indicating a legitimizing reason for the user to access at least the subset of the data for use in the data processing activity;
   transforming, at the database proxy, the query based at least in part on an encryption schema of the database; and
   executing, at the database, the transformed query based at least in part on identifying the data processing permit, wherein executing the transformed query comprises:
      filtering out a first subset of data fields from a data column of the database based at least in part on a hidden column of the database indicating row-level consent for the data column, the hidden column failing to support direct querying of values stored in the hidden column; and
      determining a query result for the transformed query based at least in part on the filtering.

2. The method of claim 1, wherein the query comprises a request for the data stored in the database and a user identifier corresponding to the user and associated with the request for the data, the transforming further comprising:
   encrypting the user identifier with a permit key associated with the identified data processing permit, wherein the transformed query comprises a select statement indicating the encrypted user identifier.

3. The method of claim 2, further comprising:
   receiving the legitimizing reason for the user to access at least the subset of the data for use in the data processing activity;
   generating the data processing permit applicable to the data processing activity and the user identifier based at least in part on receiving the legitimizing reason;
   encrypting the user identifier with the permit key associated with the data processing permit based at least in part on receiving the legitimizing reason; and
   storing, in the database, the encrypted user identifier with a relation to at least the subset of the data stored in the database.

4. The method of claim 3, wherein:
   the encrypted user identifier is stored in a column in the database;
   the column supports executing the select statement for the query in the database; and
   the encrypted user identifier provides access to a row in the database comprising at least the subset of the data.

5. The method of claim 1, further comprising:
   receiving, at the database proxy, a second query associated with a second user and comprising a second indication of the data associated with the database, wherein the second query further comprises second privacy metadata indicating a second data processing activity for using the data;
   failing to identify a second data processing permit stored for the database system that is applicable to both the second data processing activity and the second user; and
   refraining from retrieving the data in response to the second query based at least in part on failing to identify the second data processing permit.

6. The method of claim 1, wherein the query comprises a request for the data stored in the database, and the executing the transformed query further comprises:
   identifying, in the database, a consent status for a data field based at least in part on the data processing activity, wherein the consent status is based at least in part on the data processing permit; and
   retrieving at least the subset of the data from the database based at least in part on the identified consent status.

7. The method of claim 6, further comprising:
   accessing a table in the database based at least in part on a reference stored with the data, wherein the consent status is identified based at least in part on a value stored in the table, the data processing activity, the data processing permit, or a combination thereof.

8. The method of claim 1, wherein executing the transformed query further comprises:
   receiving, at the database proxy, the query result based at least in part on executing the transformed query at the database; and
   modifying, at the database proxy, the query result based at least in part on the data processing permit applicable to the data processing activity.

9. The method of claim 8, wherein the modifying further comprises:
   filtering the query result based at least in part on the data processing permit.

10. The method of claim 1, wherein the query result comprises a ciphertext query result, the method further comprising:
receiving, at the database proxy, the ciphertext query result based at least in part on executing the transformed query at the database; and
decrypting, at the database proxy, the ciphertext query result to obtain a plaintext query result based at least in part on the encryption schema of the database.

11. The method of claim 10, wherein the query is received from a user device, the method further comprising:
transmitting, to the user device, the plaintext query result in response to the query.

12. The method of claim 10, wherein:
the data is encrypted at rest in the database; and
the data is encrypted in the database during execution of the transformed query.

13. The method of claim 1, wherein transforming the query further comprises:
performing one or more calls to one or more user-defined functions for the database system based at least in part on a clause in the query, an operator in the query, the encryption schema of the database, or a combination thereof.

14. The method of claim 1, wherein:
the data is stored in the database in a plurality of columns using a plurality of respective encryption schemes; and
the database executes the transformed query on the data column of the plurality of columns based at least in part on a query function for the transformed query supported by the data column according to a respective encryption scheme for the data column.

15. The method of claim 1, wherein:
the data is stored in the database in a single column using a plurality of layered encryption schemes;
the database decrypts one or more layers of the plurality of layered encryption schemes based at least in part on a query function for the transformed query; and
the database executes the transformed query on the single column based at least in part on the decrypted one or more layers of the plurality of layered encryption schemes, wherein the single column is the data column.

16. The method of claim 1, further comprising:
installing the database proxy for the database system;
determining, at the database proxy, an initial schema of the database; and
updating the initial schema of the database to the encryption schema of the database based at least in part on the initial schema of the database and a plurality of data processing permits associated with installing the database proxy.

17. An apparatus for data processing at a database system comprising a database proxy and a database, the apparatus comprising:
a processor;
memory coupled with the processor; and
instructions stored in the memory and executable by the processor to cause the apparatus to:
receive, at the database proxy, a query associated with a user and comprising an indication of data associated with the database, wherein the query further comprises privacy metadata indicating a data processing activity for using the data;
identify a data processing permit stored for the database system that supports both the query and at least a subset of the data indicated by the query based at least in part on the data processing permit indicating a legitimizing reason for the user to access at least the subset of the data for use in the data processing activity;
transform, at the database proxy, the query based at least in part on an encryption schema of the database; and
execute, at the database, the transformed query based at least in part on identifying the data processing permit, wherein the instructions executable by the processor to cause the apparatus to execute the transformed query are executable by the processor to cause the apparatus to:
filter out a first subset of data fields from a data column of the database based at least in part on a hidden column of the database indicating row-level consent for the data column, the hidden column failing to support direct querying of values stored in the hidden column; and
determine a query result for the transformed query based at least in part on the filtering.

18. A non-transitory computer-readable medium storing code for data processing at a database system comprising a database proxy and a database, the code comprising instructions executable by a processor to:
receive, at the database proxy, a query associated with a user and comprising an indication of data associated with the database, wherein the query further comprises privacy metadata indicating a data processing activity for using the data;
identify a data processing permit stored for the database system that supports both the query and at least a subset of the data indicated by the query based at least in part on the data processing permit indicating a legitimizing reason for the user to access at least the subset of the data for use in the data processing activity;
transform, at the database proxy, the query based at least in part on an encryption schema of the database; and
execute, at the database, the transformed query based at least in part on identifying the data processing permit, wherein the instructions executable by the processor to execute the transformed query are executable by the processor to:
filter out a first subset of data fields from a data column of the database based at least in part on a hidden column of the database indicating row-level consent for the data column, the hidden column failing to support direct querying of values stored in the hidden column; and
determine a query result for the transformed query based at least in part on the filtering.

* * * * *